(12) United States Patent
Bennett et al.

(10) Patent No.: US 11,625,388 B2
(45) Date of Patent: Apr. 11, 2023

(54) SYSTEM WITH TASK ANALYSIS FRAMEWORK DISPLAY TO FACILITATE UPDATE OF ELECTRONIC RECORD INFORMATION

(71) Applicant: Hartford Fire Insurance Company, Hartford, CT (US)

(72) Inventors: Jonathan R Bennett, Hartford, CT (US); Laura J Osborn, Prospect, CT (US); Sarah E Daly, Southington, CT (US); Ellen J. St. Pierre, Cheshire, CT (US); Margaret M Schroeder, Glastonbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 642 days.

(21) Appl. No.: 16/555,129

(22) Filed: Aug. 29, 2019

(65) Prior Publication Data
US 2021/0064603 A1    Mar. 4, 2021

(51) Int. Cl.
| | | |
|---|---|---|
| *G06Q 10/00* | (2012.01) | |
| *G06F 16/23* | (2019.01) | |
| *G06Q 10/0637* | (2023.01) | |
| *G06Q 10/0639* | (2023.01) | |

(52) U.S. Cl.
CPC ...... *G06F 16/2379* (2019.01); *G06F 16/2365* (2019.01); *G06Q 10/0637* (2013.01); *G06Q 10/06398* (2013.01)

(58) Field of Classification Search
None
See application file for complete search history.

(56) References Cited

U.S. PATENT DOCUMENTS

| | | | |
|---|---|---|---|
| 2005/0114829 A1* | 5/2005 | Robin | G06Q 10/06 717/101 |
| 2006/0064352 A1 | 3/2006 | Paschal | |

(Continued)

OTHER PUBLICATIONS

Smith, Russell, Use the Update Compliance in Operations Management Suite to Monitor Windows Updates, May 30, 2017, Petri, https://petri.com/use-update-compliance-operations-management-suite-monitor-windows-updates/, p. 1-7. (Year: 2017).*

*Primary Examiner* — Joseph M Waesco
(74) *Attorney, Agent, or Firm* — Buckley, Maschoff & Talwalkar LLC

(57) ABSTRACT

A task analysis data store may contain electronic records representing task analysis items for an enterprise. A back-end application computer server may receive, from a remote user device, first step data about task objectives for task identifier and update the task analysis data store. The server may then automatically evaluate the first step data in accordance with a first step data evaluation rule. When the first step data complies with the first step data evaluation rule, the server may permit receipt of second step data about a task analysis and update the task analysis data store. The server may then automatically evaluate the second step data in accordance with a second step data evaluation rule. When the second step data complies with the second step data evaluation rule, the server may permit receipt of third step data about analysis presentation and update the task analysis data store.

19 Claims, 30 Drawing Sheets

(56) References Cited

U.S. PATENT DOCUMENTS

| | | | |
|---|---|---|---|
| 2006/0161444 A1* | 7/2006 | Lubrecht | G06Q 10/06395 705/7.41 |
| 2007/0208653 A1* | 9/2007 | Murphy | G06Q 40/04 705/37 |
| 2008/0085497 A1 | 4/2008 | Holmes | |
| 2008/0092108 A1* | 4/2008 | Corral | G06Q 10/1095 717/101 |
| 2008/0103957 A1* | 5/2008 | Murphy | G06Q 40/04 705/37 |
| 2009/0111076 A1 | 4/2009 | Winterrowd | |
| 2010/0233663 A1 | 9/2010 | Pennington et al. | |
| 2011/0145284 A1 | 6/2011 | Fliess et al. | |
| 2013/0144605 A1* | 6/2013 | Brager | G06F 16/30 704/9 |
| 2013/0290200 A1* | 10/2013 | Singhal | G06Q 10/0637 705/317 |
| 2014/0207694 A1* | 7/2014 | Vickery | G06Q 30/018 705/317 |
| 2015/0026760 A1* | 1/2015 | Lipman | G06F 21/6245 726/1 |
| 2015/0170072 A1* | 6/2015 | Grant | H04L 63/0263 705/7.36 |
| 2015/0310757 A1 | 10/2015 | Moon et al. | |
| 2015/0379416 A1* | 12/2015 | Holtzman | G06Q 30/0278 706/11 |
| 2017/0103231 A1* | 4/2017 | Lipman | G06F 21/6245 |
| 2017/0293874 A1* | 10/2017 | Asaf | G06N 3/0436 |
| 2018/0330290 A1* | 11/2018 | Mack | G06Q 10/067 |
| 2019/0087404 A1 | 3/2019 | Scheur et al. | |
| 2019/0332807 A1* | 10/2019 | LaFever | G06F 21/6254 |
| 2019/0385240 A1* | 12/2019 | Lee | G06F 16/215 |
| 2020/0296138 A1* | 9/2020 | Crabtree | H04L 63/1425 |
| 2020/0372533 A1* | 11/2020 | Rammal | H04L 9/3247 |
| 2022/0060511 A1* | 2/2022 | Crabtree | H04L 63/20 |

\* cited by examiner

SYSTEM WITH TASK ANALYSIS FRAMEWORK DISPLAY TO FACILITATE UPDATE OF ELECTRONIC RECORD INFORMATION

BACKGROUND

Electronic records, such as files and database entries, may be stored and utilized by an enterprise. For example, a company such as an insurance enterprise might access and update electronic records associated with tasks that might be performed (e.g., a project to implement a new software architecture or a new business arrangement). Each task may be associated with a number of different items or processes that need to be selected, arranged, and/or performed to successfully complete the task. Accurately creating such tasks, and convincing others in the enterprise that task is appropriate, may allow for new and improved initiatives to accomplish an organization's goals. For example, successful task creation may increase efficiency by adopting a consistent, enterprise-wide framework and process across the company and let a business more effectively and quickly adapt to increasingly changing and complex environments (e.g., to help the enterprise position itself for success in current and future strategic growth initiatives). Employees implementing the tasks may want to learn a consistent business analysis framework that can be applied right away and deepen skill sets to assess current business state, identify action plans, and create long-term business strategies. Employees may also want to appeal more quickly to the needs of an audience to deliver a compelling business rationale and/or recommendation, avoid re-work associated with many tasks, enhance the detail and comprehensiveness of decision making to drive business results, and/or learn from (and share with) peers and stakeholders associated with a task.

Correctly tracking, analyzing, and presenting task requirement, however, can be a time-consuming and error-prone task for employees, managers, etc. (especially when there are a substantial number of employees, many different types of complicated tasks to be implemented, etc.). This information might typically be compiled and stored using a spreadsheet application (e.g., such as the EXCEL® spreadsheet application available from Microsoft®), PowerPoint presentations, etc. Manually creating, updating, and analyzing appropriate electronic records in this way, however, can be a difficult process. It would therefore be desirable to provide systems and methods to access and update electronic records representing a task analysis framework for an enterprise in a way that provides faster, more accurate results.

SUMMARY OF THE INVENTION

According to some embodiments, systems, methods, apparatus, computer program code and means are provided to access and update electronic records representing a task analysis framework for an enterprise in a way that provides faster, more accurate results and that allow for flexibility and effectiveness when analyzing those results. In some embodiments, a task analysis data store may contain electronic records representing a plurality of task analysis items for an enterprise. A back-end application computer server may receive, from a remote user device, first step data about task objectives for task identifier and update the task analysis data store. The server may then automatically evaluate the first step data in accordance with a first step data evaluation rule. When the first step data complies with the first step data evaluation rule, the server may permit receipt of second step data about a task analysis and update the task analysis data store. The server may then automatically evaluate the second step data in accordance with a second step data evaluation rule. When the second step data complies with the second step data evaluation rule, the server may permit receipt of third step data about analysis presentation and update the task analysis data store.

Some embodiments comprise: means for receiving, at the back-end application computer server from a remote user device associated with a user, first step data about task objectives associated with a task identifier; means for updating a task analysis data store based on the received first step data, wherein the task analysis data store contains electronic records representing a plurality of task analysis items for the enterprise and, for each planned task analysis item, an electronic record identifier and a set of task analysis item attribute values including the task identifier; means for automatically evaluating the first step data in accordance with at least one first step data evaluation rule; when the first step data complies with the at least one first step data evaluation rule, means for permitting receipt of second step data about a task analysis associated with the task identifier; means for updating the task analysis data store based on the received second step data; means for automatically evaluating the second step data in accordance with at least one second step data evaluation rule; when the second step data complies with the at least one second step data evaluation rule, means for permitting receipt of third step data about analysis presentation associated with the task identifier; and means for updating the task analysis data store based on the received third step data.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to access and update electronic records representing a task analysis framework for an enterprise in a way that provides faster, more accurate results. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic record attribute access, update, and/or analysis by providing benefits in data accuracy, data availability, and data integrity—and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention task information may be entered, accessed, updated (e.g., with checklists or other data), analyzed, and/or presented via a back-end application server to accurately improve the exchange of information, thus improving the overall efficiency of the system associated with message storage requirements and/or bandwidth considerations (e.g., by reducing the number of messages that need to be transmitted via a network). Moreover, embodiments associated with accessing and updating accurate, pertinent information might further improve employee planning and performance, project execution, allocations of resources, electronic record processing decisions (e.g., to automatically generate an alert signal or message when task items or performance diverge more than a threshold amount), etc.

Figure 1:
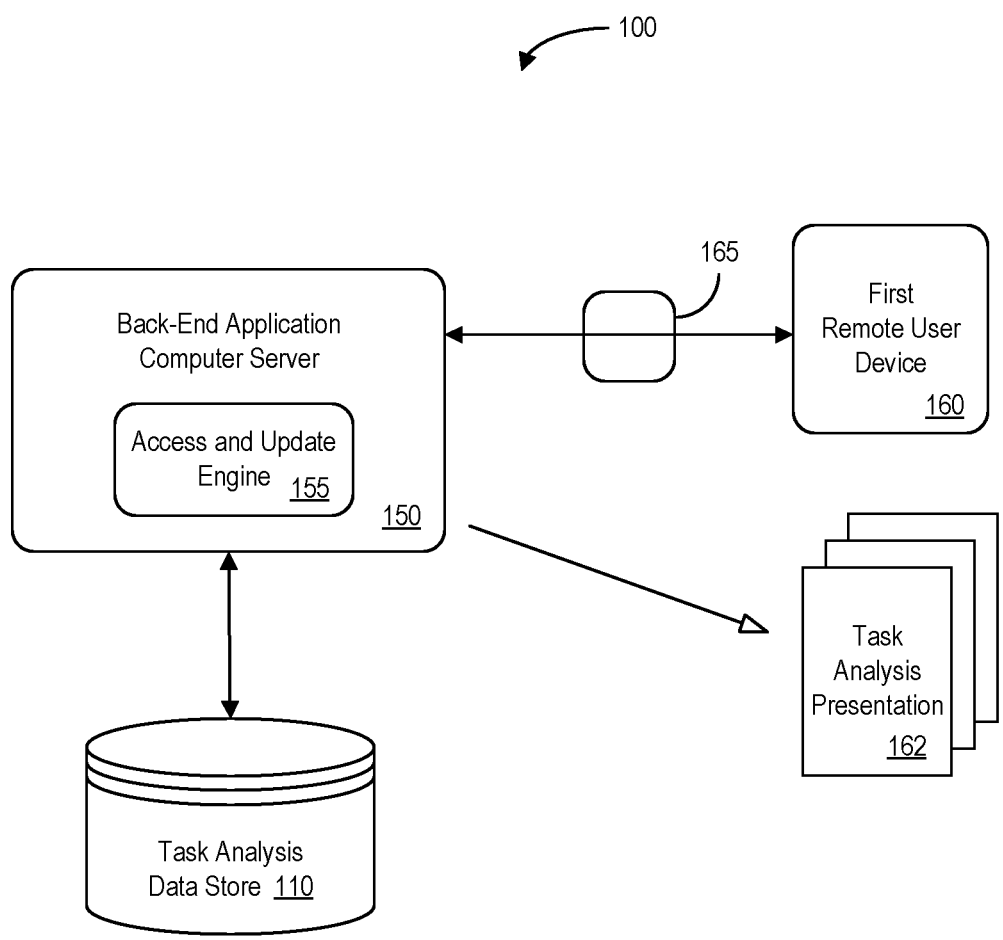
FIG. 1 is a high-level block diagram of a system in accordance with some embodiments.

FIG. 1 is a high-level block diagram of a system 100 according to some embodiments of the present invention. In particular, the system 100 includes a back-end application computer 150 server that may be used to enter and/or access information in a task analysis data store 110 (e.g., storing a set of electronic records representing a task to be performed with each record including, for example, one or more task identifiers, attribute variables, resource values, etc.). The back-end application computer server 150 may also store and/or or retrieve information via other data stores or sources in connection with an access and update engine 155 to view, analyze, update, and/or present the electronic records. The back-end application computer server 150 may also exchange information with a remote user device 160 and other remote user devices (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about a task being analyzed) and/or the remote user device 160. For example, the remote user device 160 may transmit checklists and other information to the back-end application computer server 150. Based on the updated information, the back-end application computer server 150 may adjust data in the task analysis data store 110 and the changes may be viewable via one or more physical task analysis presentations 162 (e.g., created using templates). The physical task analysis presentations 162 might be associated with, for example, participant materials (e.g., a workbook, case study handouts, and other templates), cloud-computing network site materials (e.g., a framework, available, resources, and other templates), coaching guide materials (e.g., a guide for leaders, main points to be covered, coaching questions, and how to support and reinforce training), facilitator materials (e.g., talking points and facilitator guidelines), etc. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the entry, access, and/or update of electronic records in the task analysis data store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the task analysis data store 110 that is locally stored or reside remote from the back-end application computer server 150. As will be described further below, the task analysis data store 110 may be used by the back-end application computer server 150 in connection with an interactive user interface to enter, update, and present electronic records. Although a single back-end application computer server 150 is shown in FIG. 1, any number of such devices may be included. Moreover, various devices described herein might be combined according to embodiments of the present invention. For example, in some embodiments, the back-end application computer server 150 and an enterprise resource management server might be co-located and/or may comprise a single apparatus and/or a cloud-based architecture.

Figure 2:
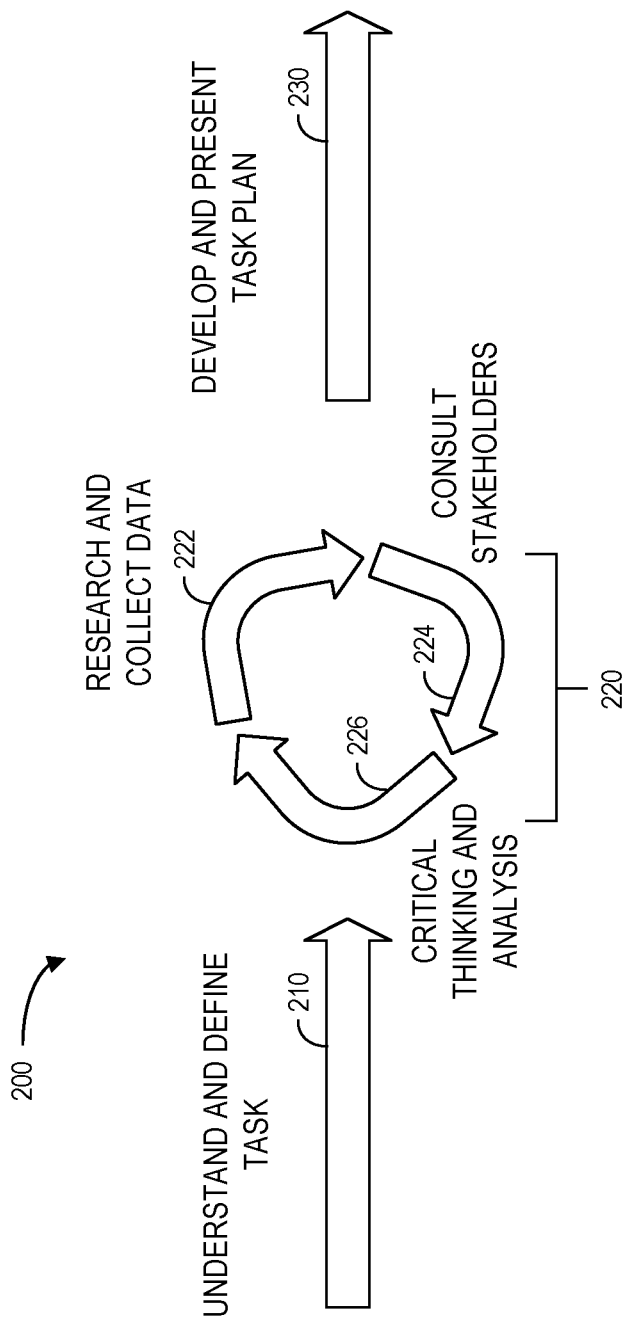
FIG. 2 illustrates a task analysis framework that may be associated with an access and update tool in accordance with some embodiments.

FIG. 2 illustrates a task analysis framework 200 associated with an access and update tool in accordance with some embodiments. The framework 200 may include a first step 210 that is associated with understanding and defining a task. The first step 210 may, for example, help ensure that a user has a thorough understanding of the task objective and desired outcomes (and may comprise a critical step in the overall process). In the first step 210, a user might define a business opportunity or problem and a desired future state, identify and contract others about expectations for the project, clarify a decision maker's goals, needs, and style, identify business drivers and/or metrics associated with the task, identify financial targets, evaluate customer experience and expectations, develop an opportunity and/or problem statement, etc.

The framework 200 may also include a second step 220 that is associated with analyzing a task. The various portions of the second step 220 may be repeated to ensure that a selected recommendation has been fully vetted and researched, all necessary stakeholders have been engaged, and that the recommendation is based on concrete research and sound judgment. That is, the process of the second step 220 may be repeated until analysis is complete and a best recommendation is selected.

The second step 220 may include a research portion 222, a consult portion 224, and an analysis portion 226. The research portion 222 might research the history of issue, perform a detailed current state analysis, review existing data and metrics, identify and collect additional data, perform a root cause analysis, perform external benchmarking, etc. The consult portion 224 may identify appropriate key stakeholders, perform a comprehensive stakeholder analysis, determine action plans for each stakeholder, meet with stakeholders to get input and feedback, test ideas with stakeholders, etc. The analysis portion 226 may brainstorm multiple approaches (e.g., looking for innovative ideas), meet with stakeholders to get new insights, test ideas, perform a cost/benefit analysis, assess and determine how to mitigate risks, perform a "what if" analysis to test accuracy of assumptions, determine when there is adequate information to proceed, narrow options by evaluating against business metrics, decide on best recommendation based on business metrics and goals of decision maker, validate with stakeholders, build buy-in support and coalitions, etc.

The framework 200 may also include a third step 230 to develop and present a task plan. The third step 230 may select a best way to present a case, based on topic and audience (e.g., "create a story line"), build materials into crisp recommendation with clear conclusions, create compelling visuals and a story (using storyboard), appeal to a decision maker's goals, needs and style, verify numbers, practice presentation, prepare for possible questions and/or resistance, communicate a compelling business case and/or story, be succinct, stress an impact of a decision on an organization and on a decision maker, invite stakeholders to react and/or challenge, probe for understanding, project confidence and a strong presence, respond to detailed questions in the moment; address resistance, gain approval and sponsorship, gain agreement on next steps and accountability, etc.

Figure 3:
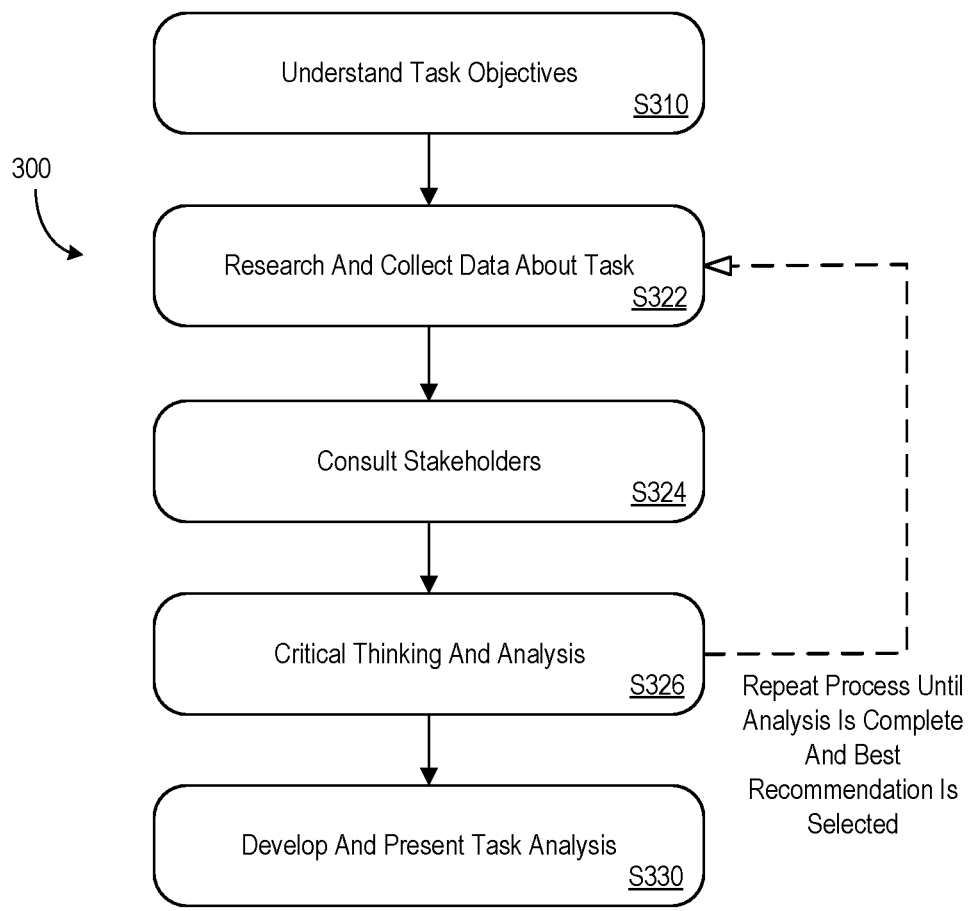
FIG. 3 is a method associated with a task analysis framework according to some embodiments of the present invention.

FIG. 3 is a method 300 associated with a task analysis framework according to some embodiments of the present invention. At S310, the system may help a user understand task objectives. At S322, the system may help the user research and collect data about the task. At S324, the system may help the user consult stakeholders (e.g., those impacted by the task). At S326, critical thinking and analysis may be performed and the process may repeat at S322 until the analysis is complete and a best recommendation for completion of task is selected. At S330, the system may develop and present a task analysis (e.g., presenting the best recommendation to a manager or decision maker).

Figure 4:
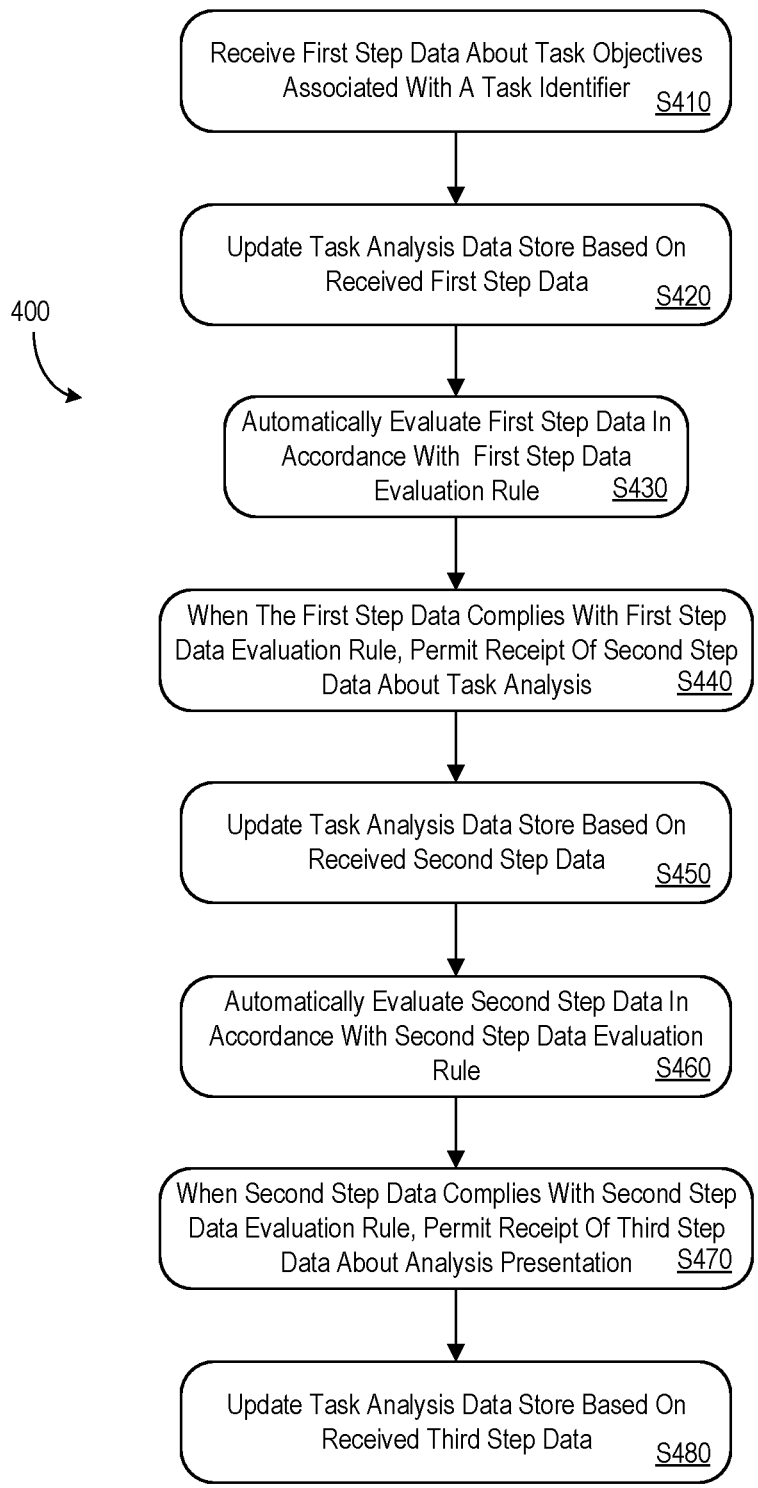
FIG. 4 is a task analysis framework method according to some embodiments.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 4 illustrates a method 400 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a back-end application computer server may receive, from a remote user device associated with a user, first step data about task objectives associated with a task identifier. The first step data might be associated with, for example, benefit details for an enterprise (e.g., an organization associated with risk relationships such as an insurance company), risk details for the enterprise, and/or a Subject Matter Expert ("SME") identifier. At S420, the system may update a task analysis data store based on the received first step data. The task analysis data store may, for example, contain electronic records representing a plurality of task analysis items for an enterprise and, for each planned task analysis item, an electronic record identifier and a set of task analysis item attribute values including the task identifier. The task analysis item attribute values might include, for example: a desired future state, a task driver, a checklist, a performance metric, criteria of success, self-rating data, risk information, a mitigation plan, an audience analysis, potential questions and responses, etc.

At S430, the system may automatically evaluate the first step data in accordance with at least one first step data evaluation rule. The at least one evaluation rule in S430 (or S470) might be associated with, for example, a checklist completion, a self-rating, supporting documentation, a minimum amount of time, a percentage of completion, an artificial intelligence review, manual review by at least one other user, etc. When the first step data complies with the at least one first step data evaluation rule, the system may permit receipt of second step data about a task analysis associated with the task identifier at S440. The second step data might be associated with, for example, research and data collection, stakeholder consultation, and/or critical analysis. According to some embodiments, the second step may be associated with a repeated process, until a recommendation is selected, including all the following: (1) research and data collection, (2) stakeholder consultation, and (3) critical analysis. Moreover, the second step data might include a stakeholder analysis containing a stakeholder identifier, a stakeholder role, an anticipated reaction, stakeholder needs and concerns, enterprise needs, plan data, etc. According to some embodiments, the second step data further includes decision making model information and/or an audience analysis for an assigned decision maker. At S450, the system may update the task analysis data store based on the received second step data.

At S460, the system may automatically evaluate the second step data in accordance with at least one second step data evaluation rule. When the second step data complies with the at least one second step data evaluation rule, the system may permit receipt of third step data about analysis presentation associated with the task identifier at S470. At S480, the system may update the task analysis data store based on the received third step data. According to some embodiments, the back-end application computer server is further programmed to automatically generate physical presentation materials based on information in the task analysis data store and/or to transmit information from the task analysis data store to another remote device associated with another user (e.g., another team member, manager, stakeholder, decision maker, etc.).

Figure 5:
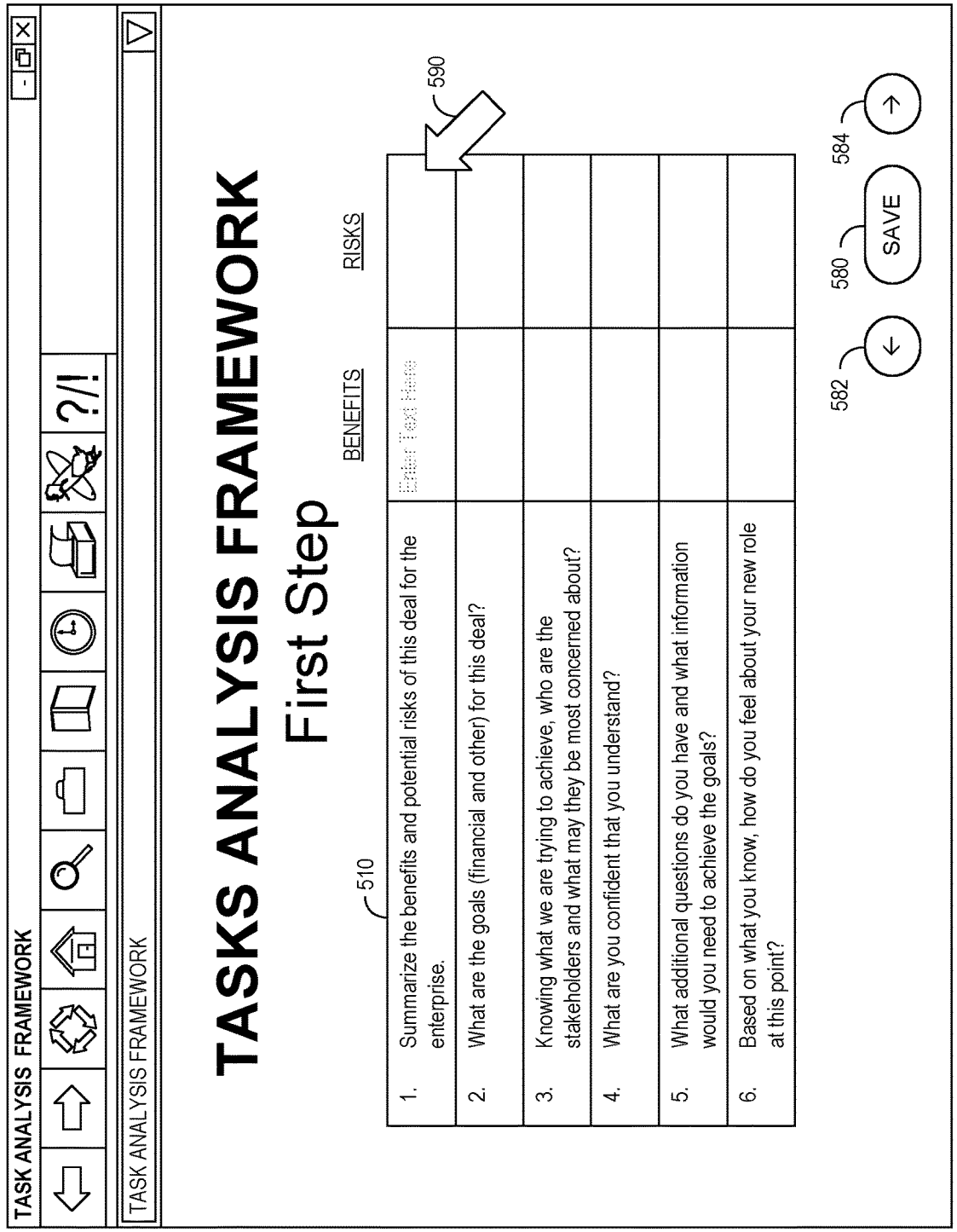
FIG. 5 is an example of a first step form display in accordance with some embodiments.

FIG. 5 is an example of a first step form display 500 in accordance with some embodiments. A user may select text entry areas in a table 510 (e.g., via a touchscreen or computer mouse pointer 590) to provide benefit and/or risk information to summarize the benefits and potential risks of a deal for an enterprise. The provided information might include, for example, text and/or attached documentation (e.g., document files, links to web pages, spreadsheets, executable program information, etc.). Similarly, the table 510 may be used to enter the goals (financial and other) for this deal, who the stakeholders are (and what may they be most concerned about), what SME's should be engaged with (e.g., who have appropriate expertise), what the user has confidence that he or she understands, any additional questions and what information is needed to achieve the goals, how a user feels about a new role, etc. The display 500 includes icons to let the user save information 580, return to a prior display 582, and/or advance to the next display 584.

Figure 6:
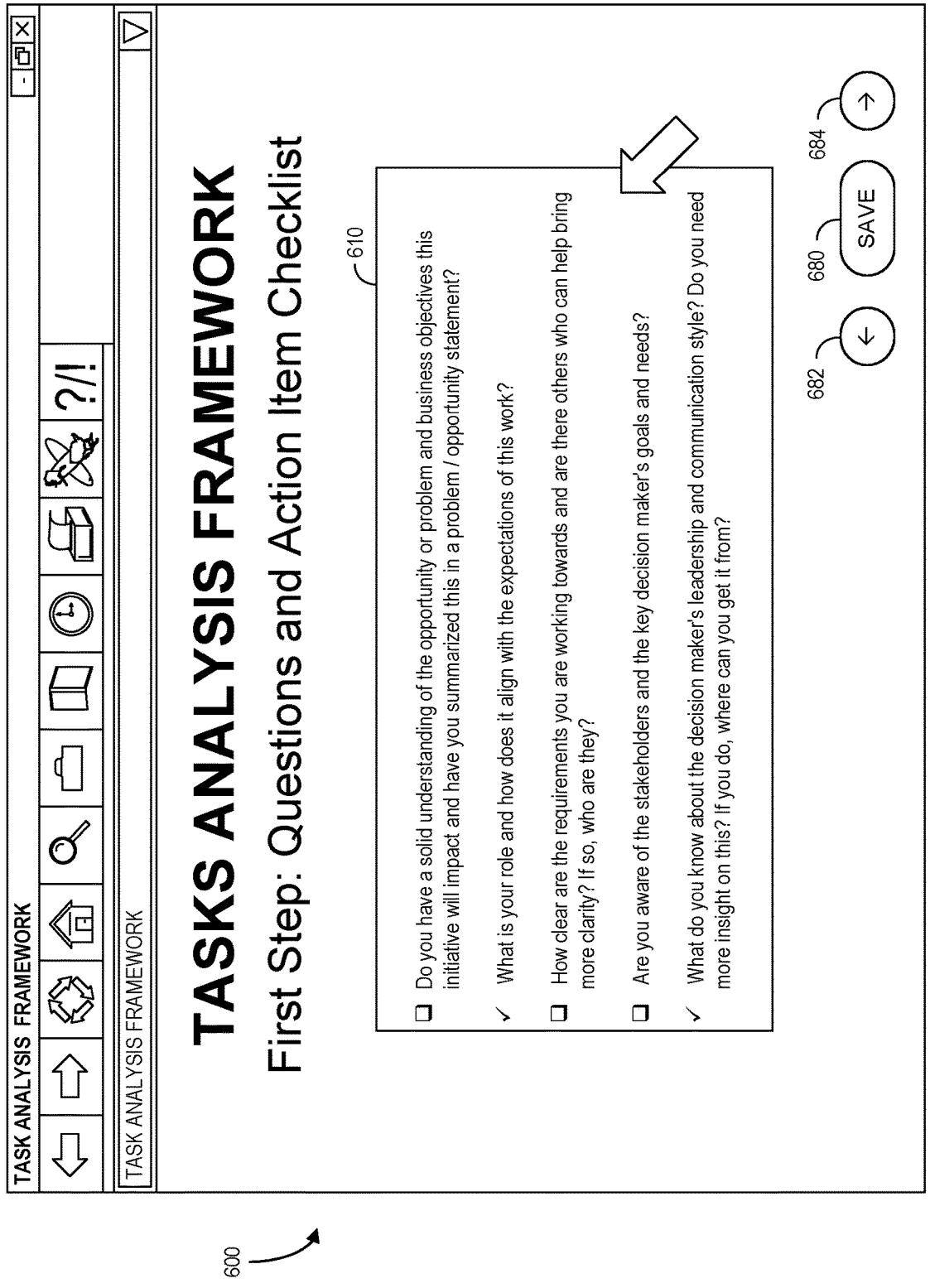
FIG. 6 is an example of a first step questions and action items checklist display according to some embodiments.

In some embodiments, a checklist may be provided to ensure that a user has a thorough understanding of the business objective and desired outcomes (which might be a critical step in the overall process). Such a checklist might define business opportunity or problem and desired future state, identify and contract on the expectations for the project, clarify the decision maker's goals, needs, and style, identify business drivers and/or metrics tied to this work, identify the financial targets, evaluate customer experience and expectations, etc. FIG. 6 is an example of a first step questions and action items checklist display 600 according to some embodiments. The display 600 has a checklist 610 that might include information about whether a user has a solid understanding of the opportunity or problem and business objectives this initiative will impact, a user's role and how it aligns with the expectations of a task, how clear requirements are and who else might help bring more clarity, the awareness of stakeholders and the key decision maker's goals and needs, a decision maker's leadership and communication style, validation of objective(s) and confirmation of checkpoints with decision makers and key stakeholders, the ability to succinctly convey the opportunity the task will support so that others understand and are inspired by it, financial and non-financial targets tied to the task and how it will be measured these with metrics, expectations for customer experience or customer impact from the task, etc. The display 600 includes icons to let the user save information 680, return to a prior display 682, and/or advance to the next display 684.

Figure 7:
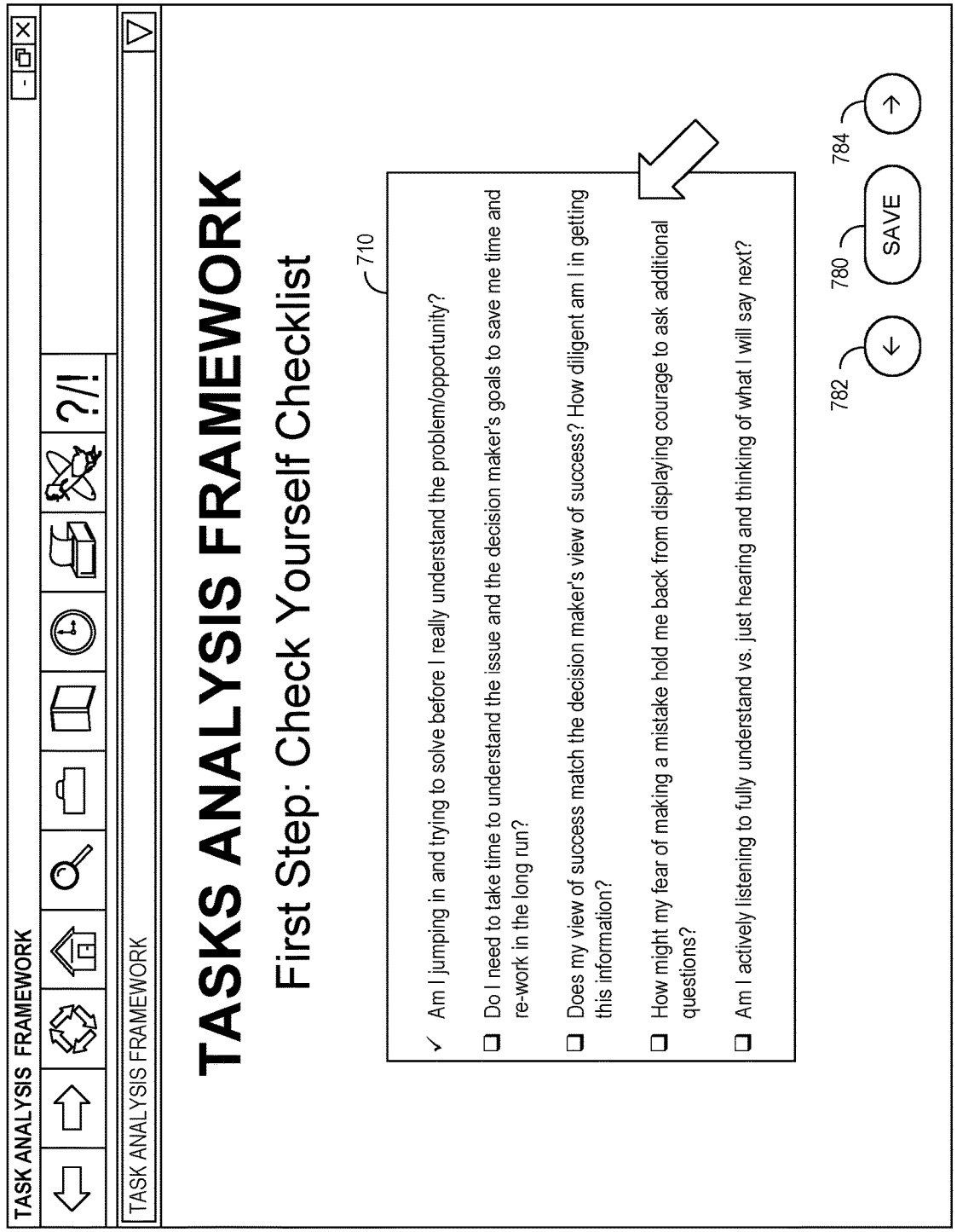
FIG. 7 is an example of a first step "check yourself" checklist display in accordance with some embodiments.

FIG. 7 is an example of a first step "check yourself" checklist display 700 in accordance with some embodiments. The display 700 includes a checklist 710 that might include information about whether a user is jumping in and trying to solve a problem before really understanding the problem/opportunity, does the user need to take time to understand the issue and the decision maker's goals to save time and re-work in the long run, does the user' view of success match the decision maker's view of success, how might a user's fear of making a mistake hold them back from displaying courage to ask additional questions, whether the user is actively listening to fully understand (instead of just hearing and thinking of what to say next, are there clear expectations for the people who support the user, has the user put himself or herself in a customer's or boss' shoes, etc. The display 700 includes icons to let the user save information 780, return to a prior display 782, and/or advance to the next display 784.

Figure 8:
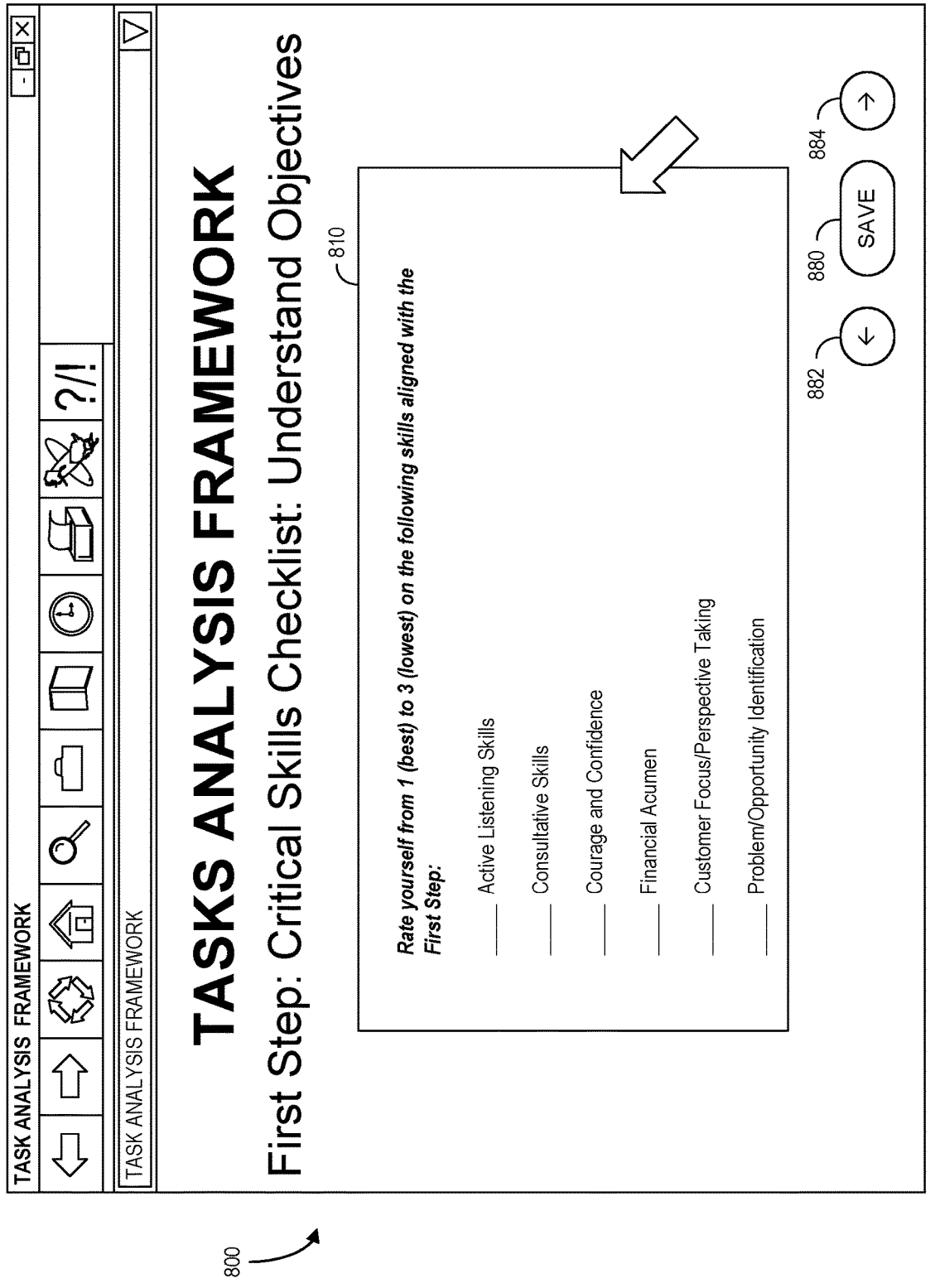
FIG. 8 is an example of a first step self-rating display according to some embodiments.

FIG. 8 is an example of a first step self-rating display 800 according to some embodiments. The display 800 may ask 810 a user to rate himself or herself from 1 (best) to 3 (lowest) on the following skills aligned with the first step: active listening skills, consultative skills, courage and confidence, financial acumen, customer focus and/or perspective taking, problem/opportunity identification; etc. The display 800 includes icons to let the user save information 880, return to a prior display 882, and/or advance to the next display 884.

Figure 9:
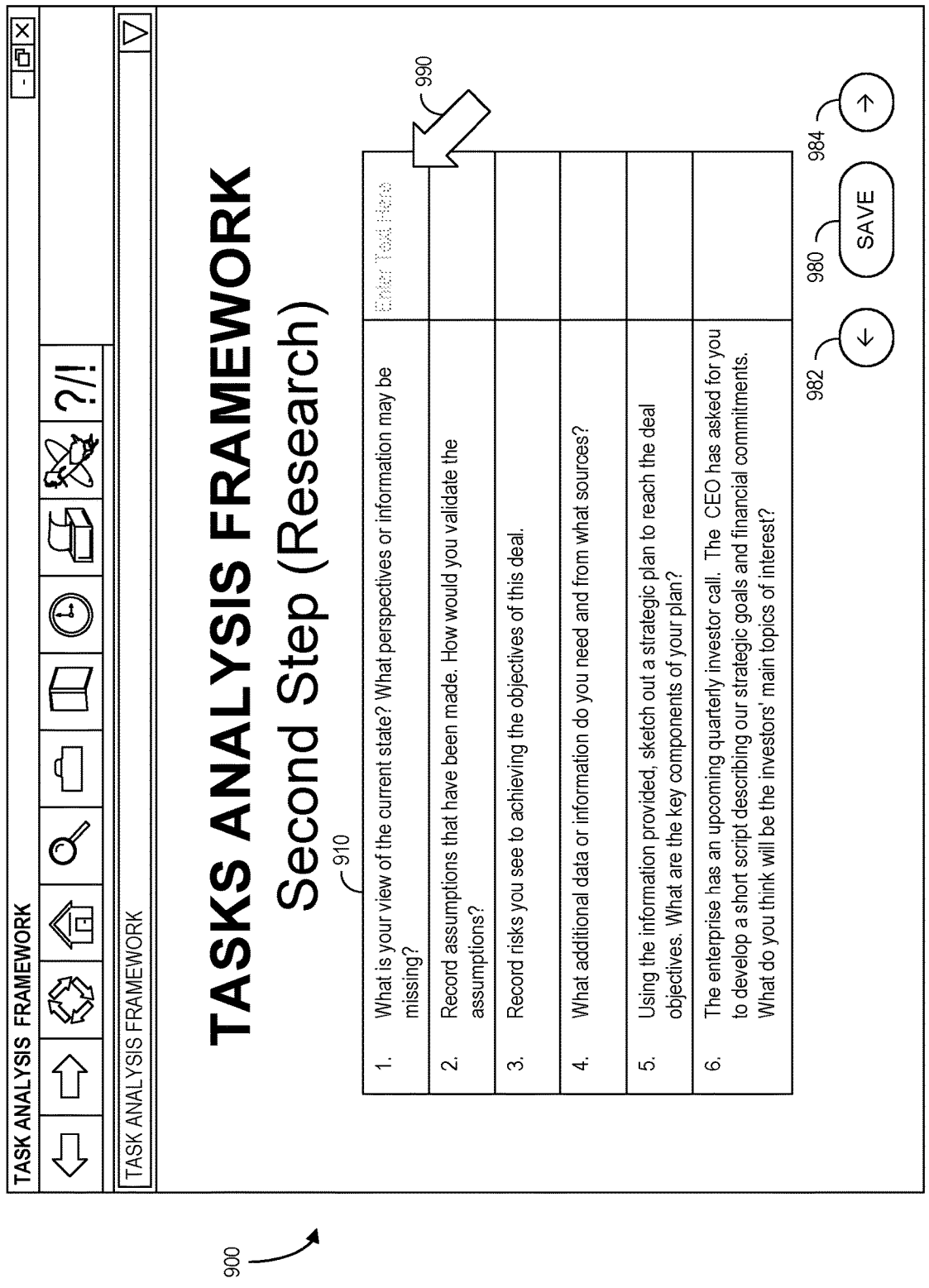
FIG. 9 is an example of a second step (research) form display in accordance with some embodiments.

FIG. 9 is an example of a second step (research) form display 900 in accordance with some embodiments. A user may select text entry areas in a table 910 (e.g., via a touchscreen or computer mouse pointer 990) to provide information about a current state and perspectives or information that may be missing. The provided information might include, for example, text and/or attached documentation (e.g., document files, links to web pages, spreadsheets, executable program information, etc.). Similarly, the table 910 may be used to enter information about assumptions that have been made, risks to achieving the objectives of this deal, additional data or information that might be needed (and from what sources), a strategic plan to reach the deal objectives, a short script describing strategic goals and financial commitments, investors' main topics of interest, recommended revenue, expense, market and distribution commitments, upsides and/or downsides, how commitments tie in with the rationale for acquiring a business, etc. The display 900 includes icons to let the user save information 980, return to a prior display 982, and/or advance to the next display 984.

Figure 10:
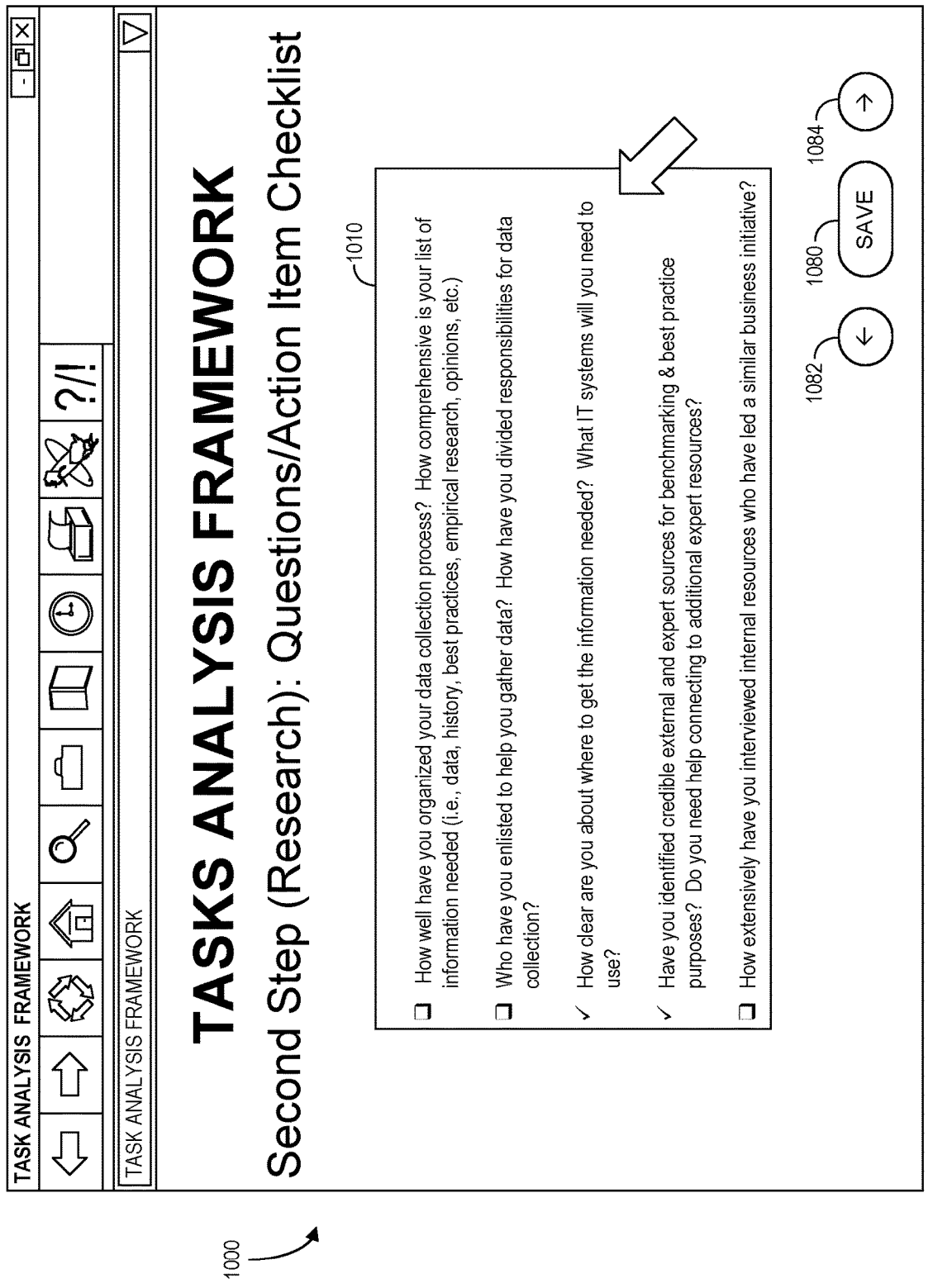
FIG. 10 is an example of a second step (research) questions and action items checklist display according to some embodiments.

The importance of repeating the second step is to ensure the selected recommendation has been fully vetted and researched, all necessary stakeholders have been engaged, and that the recommendation is based on concrete research and sound judgment. In some embodiments, a checklist for second step (research) may help a user research the history of an issue, perform a detailed current state analysis, review existing data and metrics, identify and collect additional data, perform a root cause analysis, and/or perform external benchmarking. For example, FIG. 10 is an example of a second step (research) questions and action items checklist display 1000 according to some embodiments. The display 1000 includes a checklist 1010 that may be used to provide information about the organization of a data collection process, who is helping gather data, the clarity of instructions about about where to get the information needed, credible external and expert sources for benchmarking and best practice purposes, the extent to which internal resources (who have led a similar business initiative) have been interviewed, whether the data collected provides a clear picture of the facts, a confidence level for the reliability and integrity of the data collected, a level of satisfaction with the results of a root cause analysis, whether an open mind was kept as information was gathered, resistance to any urge to begin problem solving, etc. The display 1000 includes icons to let the user save information 1080, return to a prior display 1082, and/or advance to the next display 1084.

Figure 11:
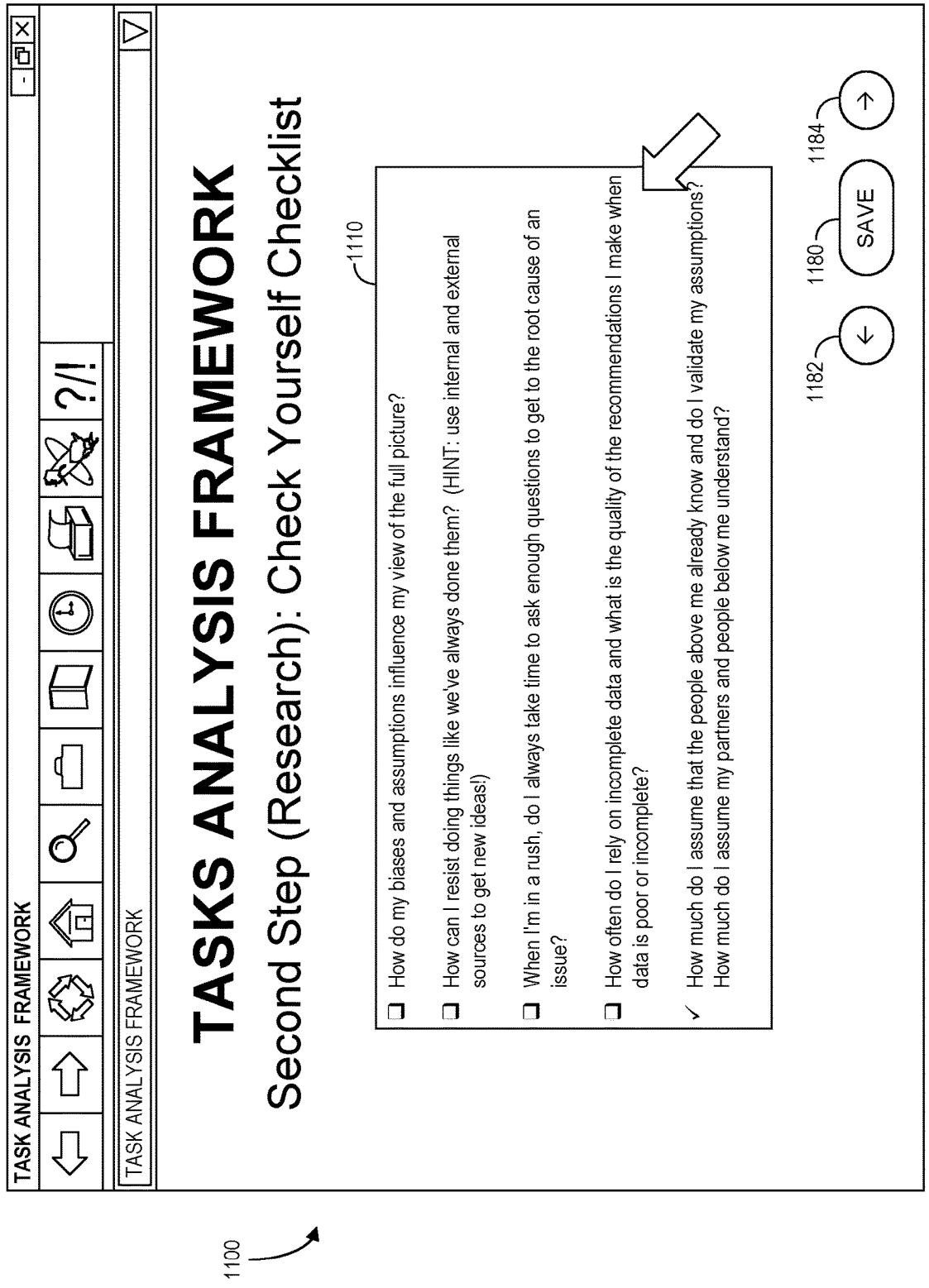
FIG. 11 is an example of a second step (research) "check yourself" checklist display in accordance with some embodiments.

FIG. 11 is an example of a second step (research) "check yourself" checklist display 1100 in accordance with some embodiments. The display 1100 includes a checklist 1110 that can be used to provide information about how biases and assumptions influence a view of the full picture, resisting doing things like they've always been done, taking time to ask enough questions to get to the root cause of an issue, reliance on incomplete data and the quality of the recommendations made when data is poor or incomplete, assumptions about what other people (above and below the user) know, etc. The display 1100 includes icons to let the user save information 1180, return to a prior display 1182, and/or advance to the next display 1184.

Figure 12:
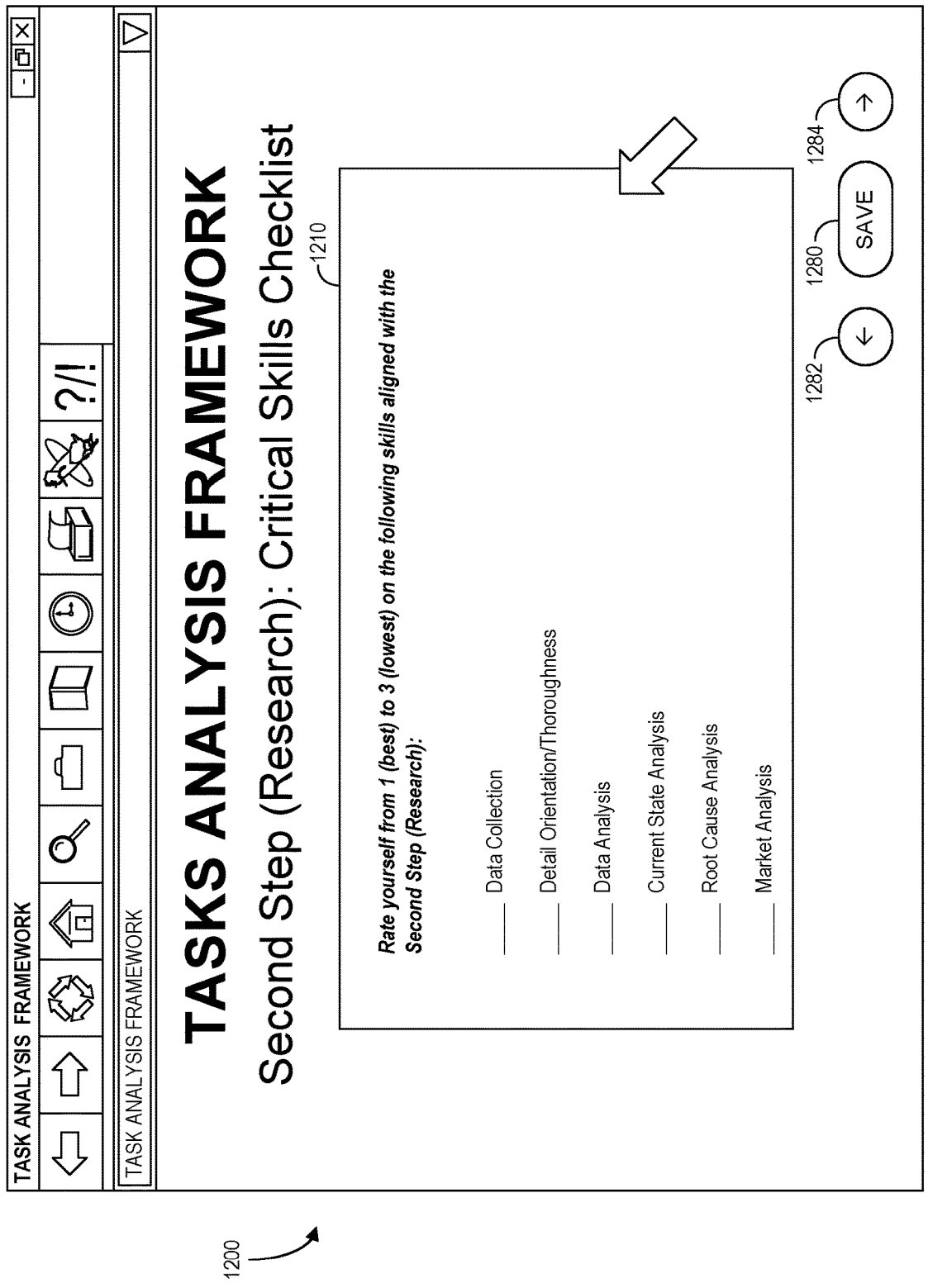
FIG. 12 is an example of a second step (research) self-rating display according to some embodiments.

FIG. 12 is an example of a second step (research) self-rating display according to some embodiments. The display 1200 may ask 1210 a user to rate himself or herself from 1 (best) to 3 (lowest) on the following skills aligned with the second step (research): data collection, detail orientation/thoroughness, data analysis, current state analysis, root cause analysis, market analysis, etc. The display 1200 includes icons to let the user save information 1280, return to a prior display 1282, and/or advance to the next display 1284.

Figure 13:
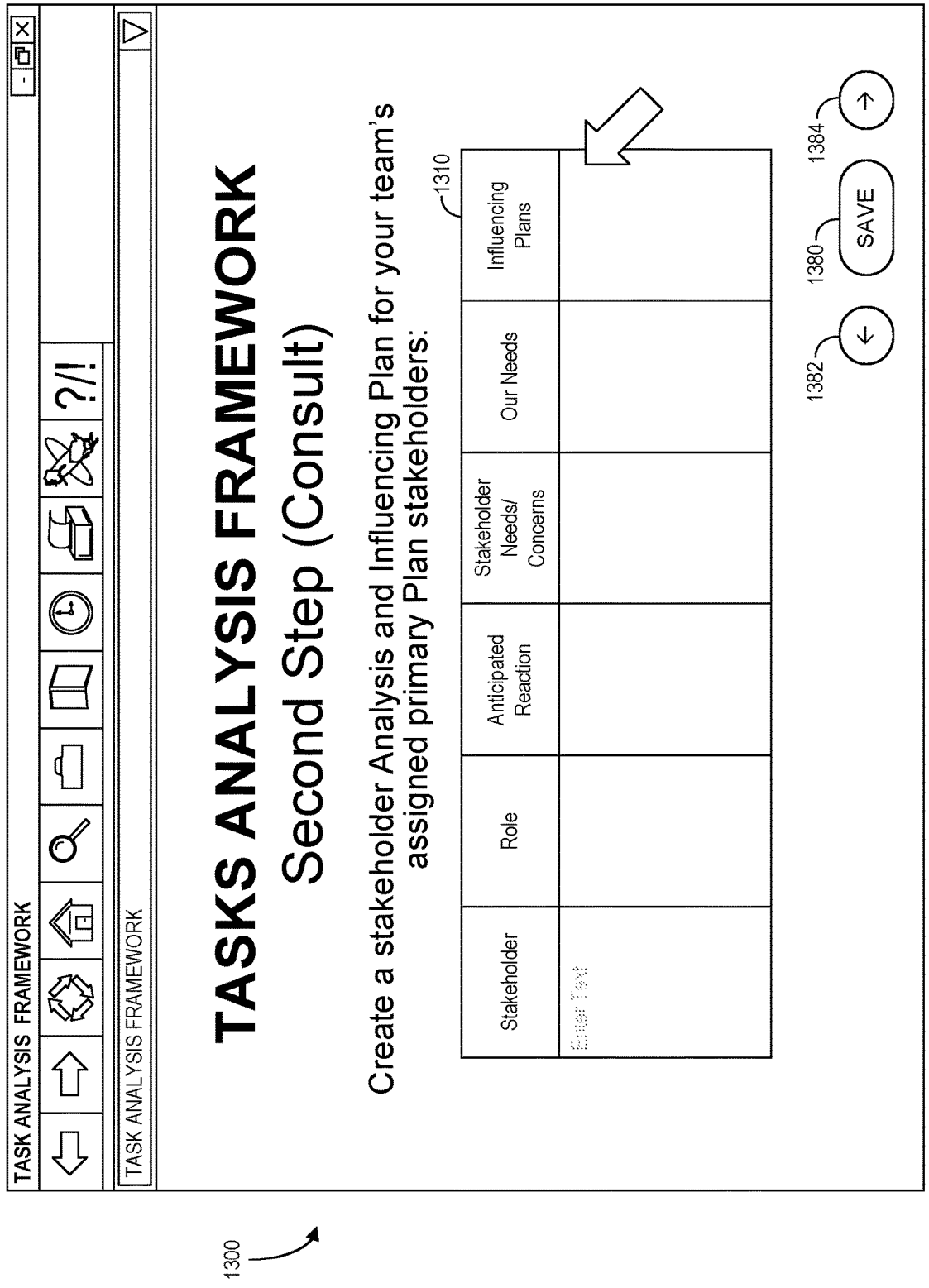
FIG. 13 is an example of a second step (consult) form display in accordance with some embodiments.

FIG. 13 is an example of a second step (consult) form display 1300 in accordance with some embodiments. The display 1300 includes a table 1310 that can be used to create a stakeholder analysis and influencing plan associated with a task. In particular, the table 1310 can be used to enter text and other data about a "stakeholder." As used herein, the term "stakeholder" might refer to, for example, any person, group, or entity that: (1) an influence the change, or (2) is affected by the change. Examples of stakeholders include individual people, groups of employees (e.g., first line supervisors), committees, departments/units, customer groups, government or other external community groups, suppliers or other external partners, competitors/marketplace, processes and/or systems, etc. The table 1310 can also be used to enter data about a "role." Note that each stakeholder may assume one or more roles. To identify each stakeholder's role(s), a user may consider if this stakeholder will: need to approve resources and/or decide whether the initiative can proceed (a "sponsor" or "gatekeeper"); need to change as a result of the effort (a "target"); need to implement changes or convince others to change (an "agent"); react to or "judge" the success of the effort; need to be an advocate of the effort (a "champion" or "supporter"); perform work that can influence the success of the effort (an "input" or "resource")?

The table 1310 may also be used to enter "anticipated reaction" information. For example, a user may indicate how the effort and any resultant changes will impact this stakeholder and if this stakeholder may benefit or be adversely affected. Given the likely impact and their prior behaviors, is the stakeholder likely to be: an active supporter (vocal, visible supporter); a passive supporter (cooperative, quiet); neither a supporter nor resister (on the fence); an active resister (expresses concerns vocally); or a passive resister (says okay but obstructs or complains behind the scenes)? The table 1310 may also be used to enter stakeholder needs and/or concerns. That is, are the primary concerns of this stakeholder about: what they need or expect from the initiative; what might influence whether they are supportive of the initiative; what this stakeholder will need to feel informed, involved, prepared, or validated during the initiative; and any "red flags" or "hot buttons" for this stakeholder.

The table 1310 may also be used to enter information about what the user needs from the stakeholder, including approval/resources; visible support/public endorsement; access to them; access to people on their team; lack of interference with or blocking of the effort; information; task completion; flexibility; and/or a change in behaviors. The table 1310 may also be used to enter influencing plan information about how the user should interact with the stakeholder. The plan information might include, for example: how the user will prepare them in connection with the initiative; how the user will communicate with them; how the user will address their needs/concerns; whether the user needs to learn more about their needs, concerns, or likely reaction; and/or whether the stakeholder should be part of the team directly (or indirectly) involved (e.g., as a representative on team, to solicit input, or to provide regular feedback)? The display 1300 includes icons to let the user save information 1380, return to a prior display 1382, and/or advance to the next display 1384.

Figure 14:
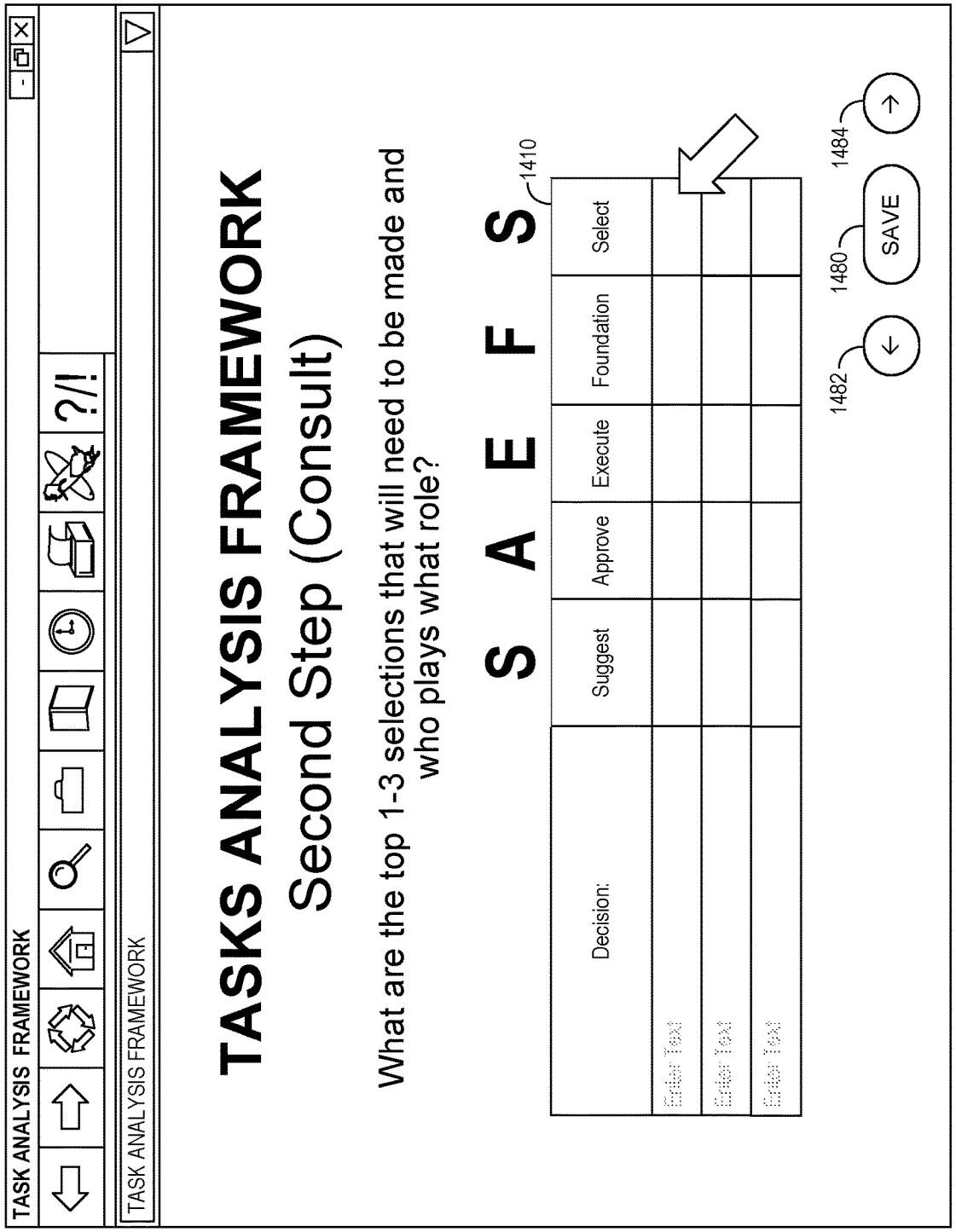
FIG. 14 is an example of a second step (consult) decision making model analysis display according to some embodiments.

FIG. 14 is an example of a second step (consult) decision making model analysis display 1400 according to some embodiments. In a decision making model analysis, the user may enter into a table 1410, for each of the top one, two, or three selections or decisions that will need to be made (and who plays what role). The table 1410 might indicate, for example, some or all of the following decision making model information: suggestion data (e.g., a proposed series of options); approve data (e.g., who needs to approve the suggestion before it can move forward); execution data (e.g., who will implement an approved idea); foundation data (e.g., facts, figures, evidence, etc.); and/or selection data (e.g., who will decide whether or not to approve). The display 1400 includes icons to let the user save information 1480, return to a prior display 1482, and/or advance to the next display 1484.

Figure 15:
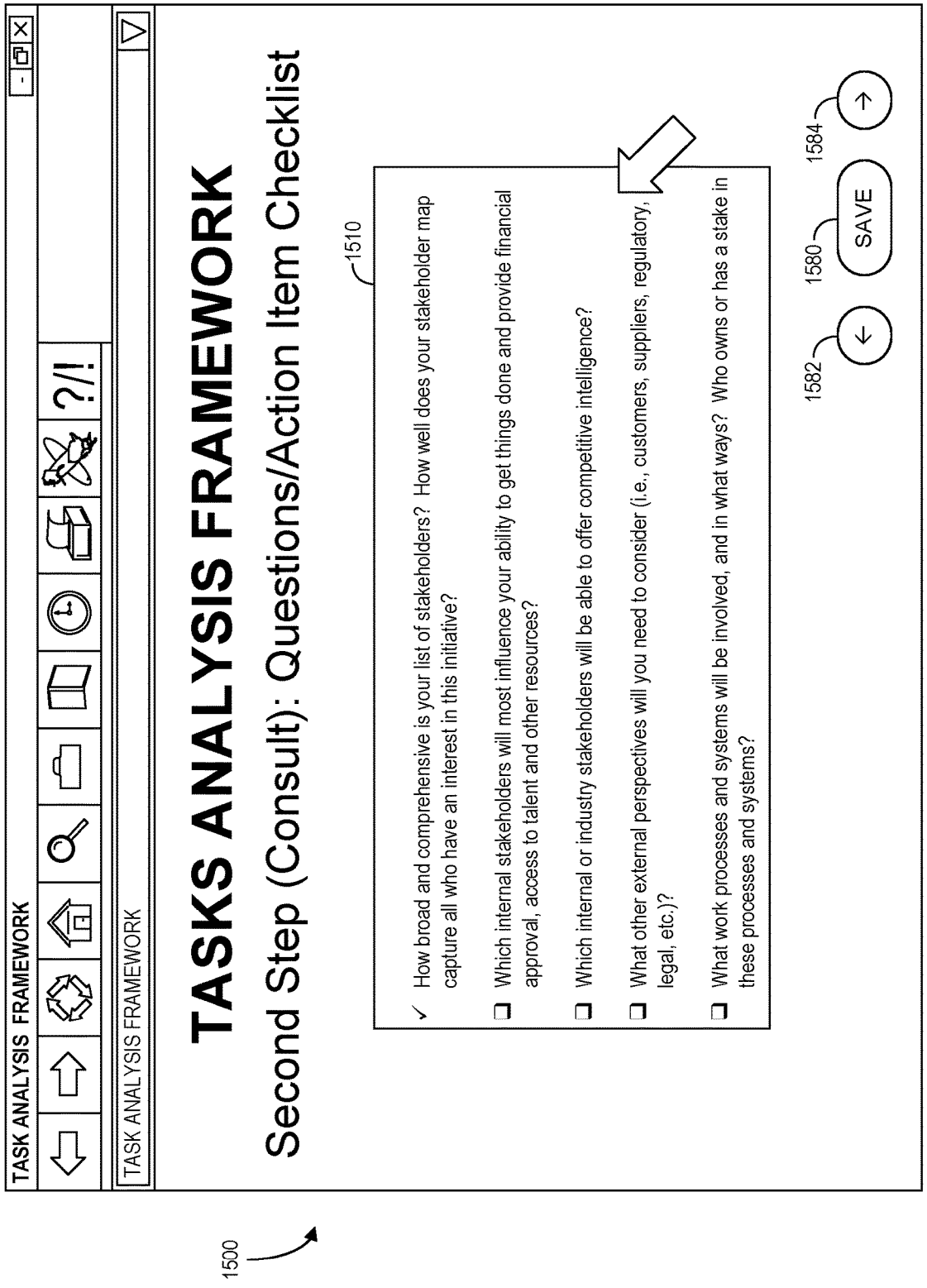
FIG. 15 is an example of a second step (consult) questions and action items checklist display according to some embodiments.

The importance of repeating the second step (consult) is to ensure that the selected recommendation has been fully vetted and researched, that all necessary stakeholders have been engaged, and that the recommendation is based on concrete research and sound judgment. The goals of the second step (consult) may include, for example, identify appropriate key stakeholders, perform a comprehensive stakeholder analysis, determine action plans for each stakeholder, meet with stakeholders to get input and feedback, test ideas with stakeholders, etc. To help achieve these goals, FIG. 15 is an example of a second step (consult) questions and action items checklist display 1500 according to some embodiments. The display 1500 includes a checklist 1510 that may be used to enter information about: how broad and comprehensive is a list of stakeholders (and how well does a stakeholder map capture all who have an interest in the initiative); which internal stakeholders will most influence an ability to get things done and provide financial approval, access to talent and other resources; which internal or industry stakeholders will be able to offer competitive intelligence; what other external perspectives that should be considered (e.g., customers, suppliers, regulatory, legal, etc.); what work processes and systems will be involved, and in what ways (and who owns or has a stake in these processes and systems); how will a user gather the views of parties who will offer different or critical/opposing perspectives; how will a user avoid the pressure to give too much weight to the opinions of a significant stakeholder (e.g., a manager, senior leaders, etc.); how will a user ensure all stakeholder input is processed objectively; what varying approaches (e.g., interview, survey, focus groups, etc.) will be used to seek stakeholder input; what preliminary ideas will be tested with stakeholders; which stakeholders can provide input into the business and financial implications of any direction; how to proactively keep stakeholders updated on status and decisions to keep channels open for additional input and buy-in; etc. The display 1500 includes icons to let the user save information 1580, return to a prior display 1582, and/or advance to the next display 1584.

Figure 16:
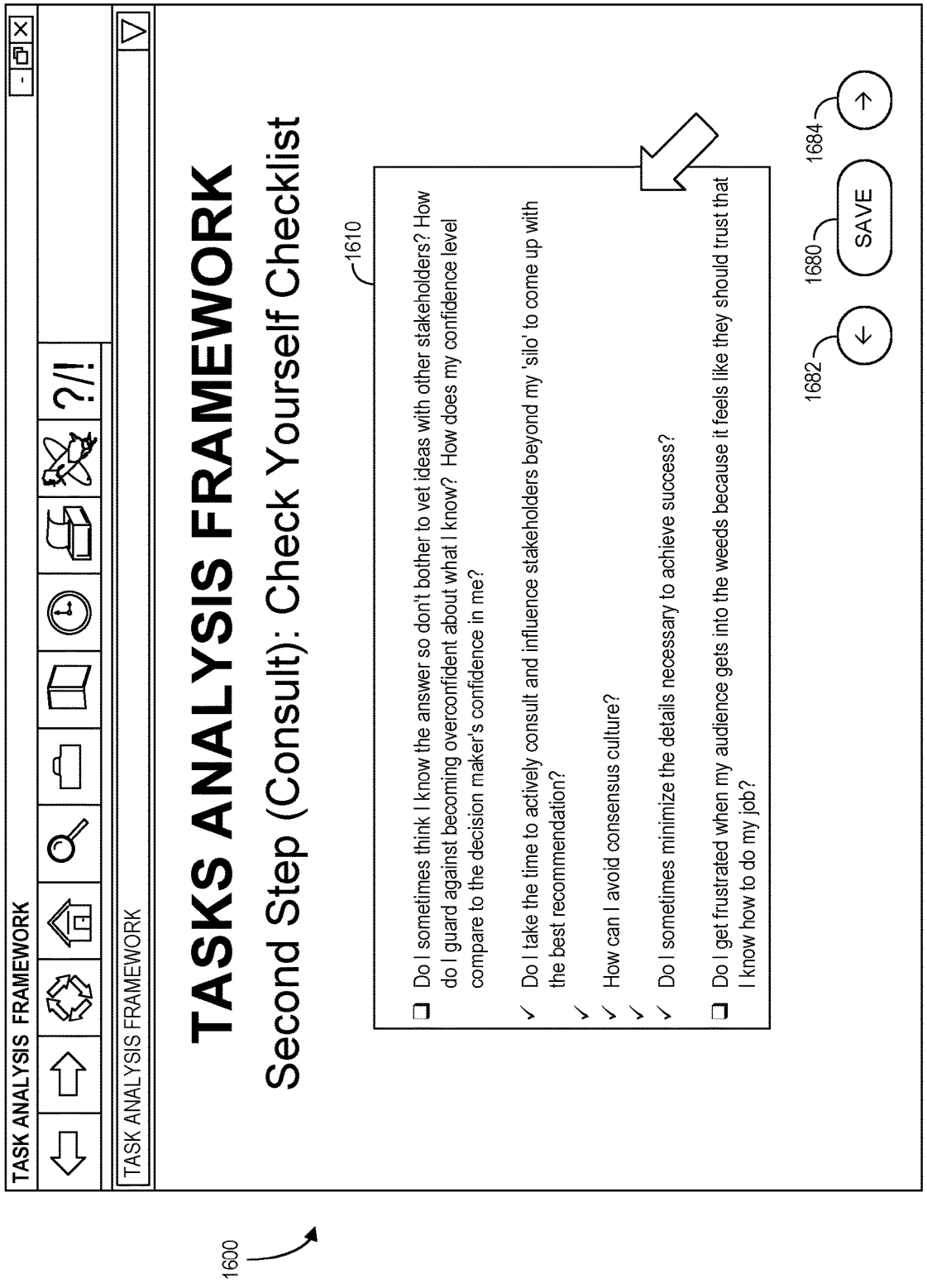
FIG. 16 is an example of a second step (consult) "check yourself" checklist display in accordance with some embodiments.

FIG. 16 is an example of a second step (consult) "check yourself" checklist display 1600 in accordance with some embodiments. The display 1600 includes a checklist 1610 that may include information about, for example: whether a user thinks he or she knows the answer and therefore doesn't bother to vet ideas with other stakeholders (e.g., being overconfident); does the user take the time to actively consult and influence stakeholders beyond a "silo" to come up with the best recommendation; how to avoid consensus culture; does the user minimize the details necessary to achieve success; does the user get frustrated when an audience gets into the weeds because it feels like they should trust that he or she knows how to do the job; does the user assume that people are filling in gaps on projects; how clearly does the user understand the expectations of a supervisor and senior leaders to communicate the full depth of a business plan; how to be assured of adhering to decision making model roles; etc. The display 1600 includes icons to let the user save information 1680, return to a prior display 1682, and/or advance to the next display 1684.

Figure 17:
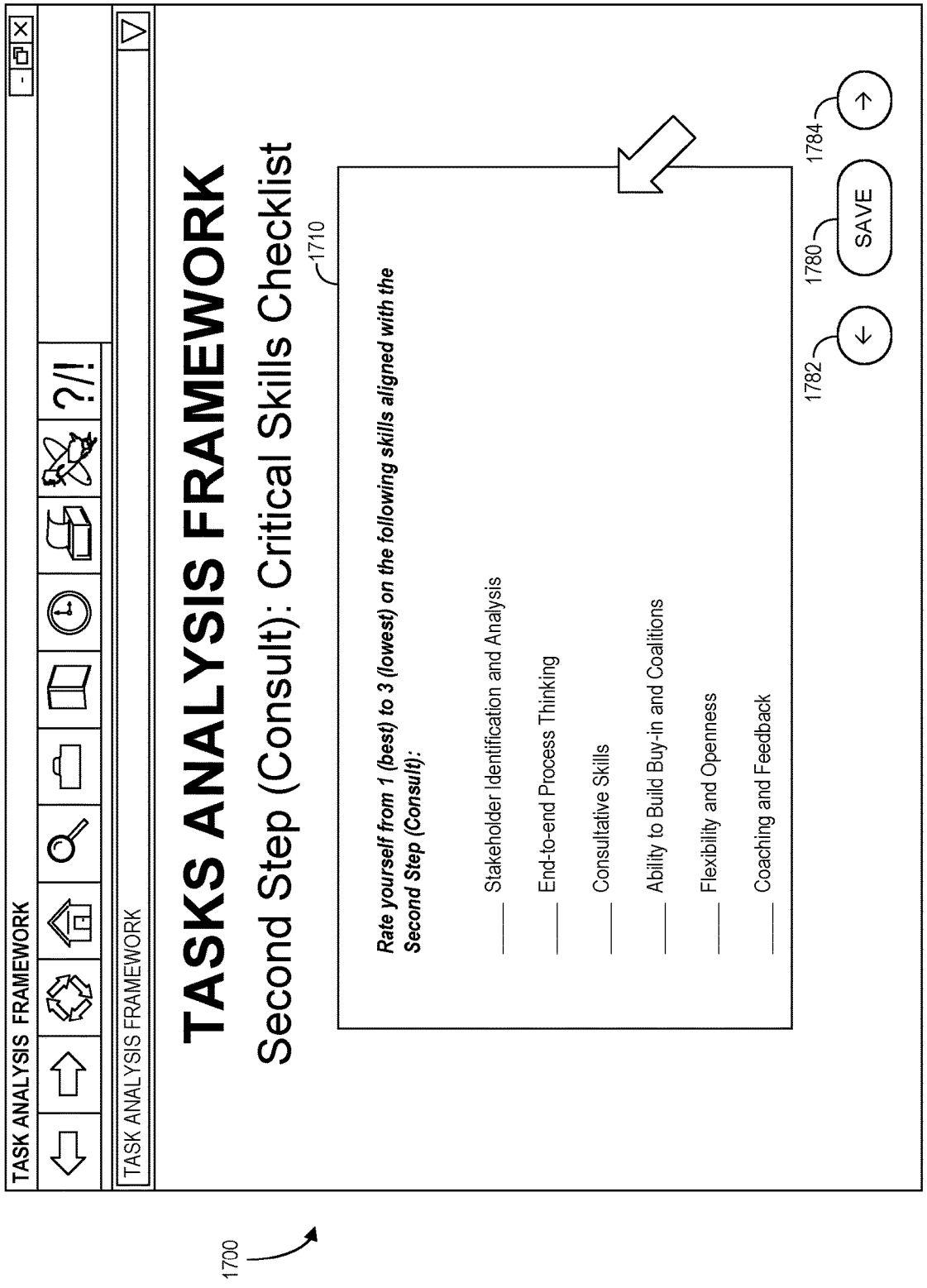
FIG. 17 is an example of a second step (consult) self-rating display according to some embodiments.

FIG. 17 is an example of a second step (consult) self-rating display 1700 according to some embodiments. The display 1700 may ask 1710 a user to rate himself or herself from 1 (best) to 3 (lowest) on the following skills aligned with the second step (consult): stakeholder identification and analysis, end-to-end process thinking, consultative skills, ability to build buy-in and coalitions, flexibility and openness, coaching and feedback, etc. The display 1700 includes icons to let the user save information 1780, return to a prior display 1782, and/or advance to the next display 1784.

Figure 18:
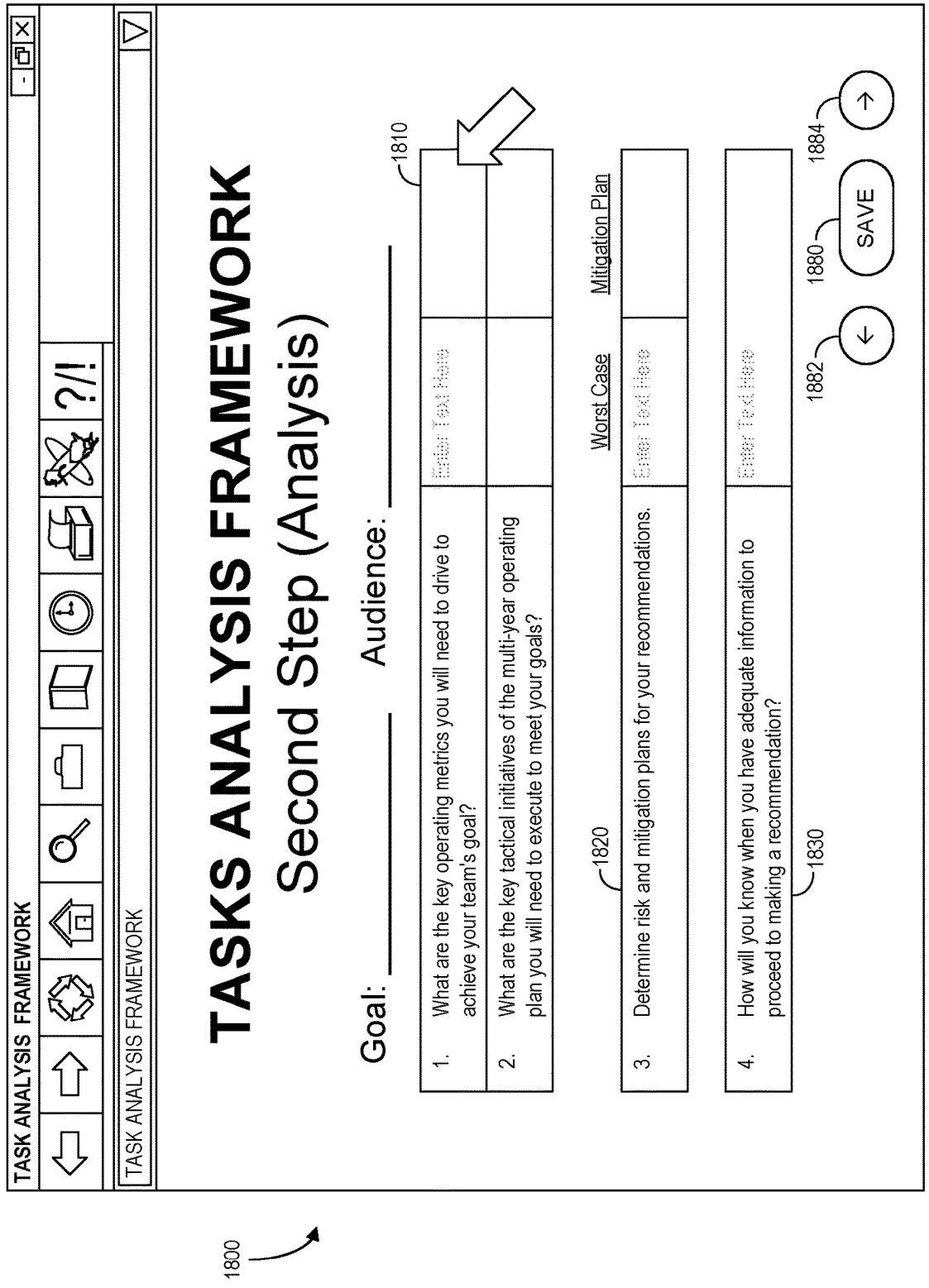
FIG. 18 is an example of a second step (analysis) form display in accordance with some embodiments.

FIG. 18 is an example of a second step (analysis) form display 1800 in accordance with some embodiments. The display 1800 includes a first table 1810 that may be used to enter information about task goals/audience including: the key operating metrics that are needed to drive to achieve a team's goal; the key tactical initiatives of a multi-year operating plan needed to meet task goals; etc. The display 1800 also includes a second table 1820 that may be used to enter information about a worst-case scenario and/or a mitigation or contingency plan including: how to determine risk and mitigation plans for recommendations (from risk adverse to thrives on risk); an organization's risk tolerance and what scenarios may occur; a worst-case scenario and associated contingency plan; etc. The display 1800 may also include a third table 1830 that may be used to enter information about, for example: how to know when adequate information is available to proceed to making a recommendation; how to be sure a decision maker will consider work as a completed, detailed analysis; etc. The display 1800 may also include icons to let the user save information 1880, return to a prior display 1882, and/or advance to the next display 1884.

Figure 19:
FIG. 19 is an example of a second step (analysis) audience analysis display in accordance with some embodiments.

After the user has completed the critical thinking and analysis, the task analysis framework may proceed to the third step to develop and present the task analysis. To help prepare for that step, FIG. 19 is an example of a second step (analysis) audience analysis display 1900 in accordance with some embodiments. The display 1900 includes a table 1910 that may be used to enter information about an audience analysis for assigned decision maker(s), including: the appropriate subject and business goal (problem to solve and/or opportunity to seize); audience; what should they think and do after the presentation; what sensitivities about this subject may an audience have; any hot buttons issues; the anticipated level of knowledge; previous decisions and/or related information; politics; costs; obstacles to achieving the objective (and how to counter them); how does the key person like to receive information; what questions are anticipated (and how to respond); etc. The display 1900 may also include icons to let the user save information 1980, return to a prior display 1982, and/or advance to the next display 1984.

Figure 20:
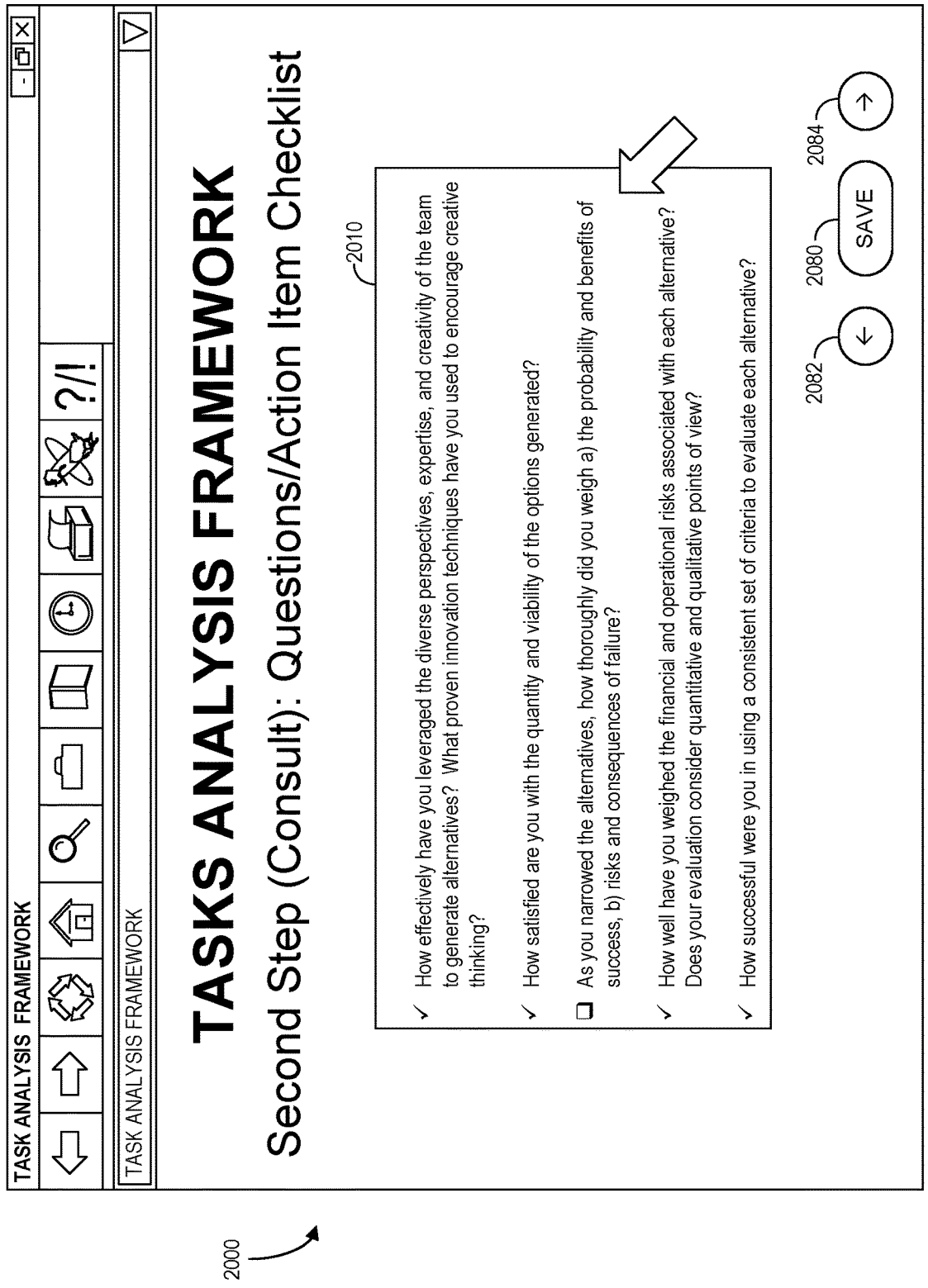
FIG. 20 is an example of a second step (analysis) questions and action items checklist display according to some embodiments.

The importance of repeating the second step (analysis) is to ensure that the selected recommendation has been fully vetted and researched, that all necessary stakeholders have been engaged, and that the recommendation is based on concrete research and sound judgment. The goals of the second step (analysis) may include: brainstorm multiple approaches; push for innovative ideas; meet with stakeholders to get new insights; test ideas; perform a cost/benefit analysis; assess and determine how to mitigate risks; perform a "what if" analysis to test accuracy of assumptions; determine when there is adequate information to proceed; narrow options by evaluating against business metrics; decide on best recommendation based on business metrics and goals of decision maker; validate with stakeholders; build buy-in and coalitions; etc. To help achieve these goals, FIG. 20 is an example of a second step (analysis) questions and action items checklist display 2000 according to some embodiments. The display 2000 includes a checklist 2010 that may be used to enter information about: how effectively has the user leveraged diverse perspectives, expertise, and creativity of the team to generate alternatives (and what proven innovation techniques were used to encourage creative thinking); a level of satisfaction about the quantity and viability of the options generated; as alternatives were narrowed, how thoroughly did the user weigh the probability and benefits of success against the risks and consequences of failure; the weight of financial and operational risks associated with each alternative (does the evaluation consider quantitative and qualitative points of view); a level of success in using a consistent set of criteria to evaluate each alternative; if there is adequate data to support conclusions?; the approach taken to identify any assumptions made in selecting an option? (what biases might influence the selection); plans to mitigate any risks associated with the preferred alternative; is the source of any underlying anxiety about the potential solution clear (are concerns more about the business implications or a personal/team stake in this decision; a level of confidence that the proposed solution will address the problem or opportunity; how to measure the effectiveness of a solution in capitalizing on the opportunity; steps have taken to test the proposed solution with stakeholders and sponsor/decision maker; etc. The display 2000 includes icons to let the user save information 2080, return to a prior display 2082, and/or advance to the next display 2084.

Figure 21:
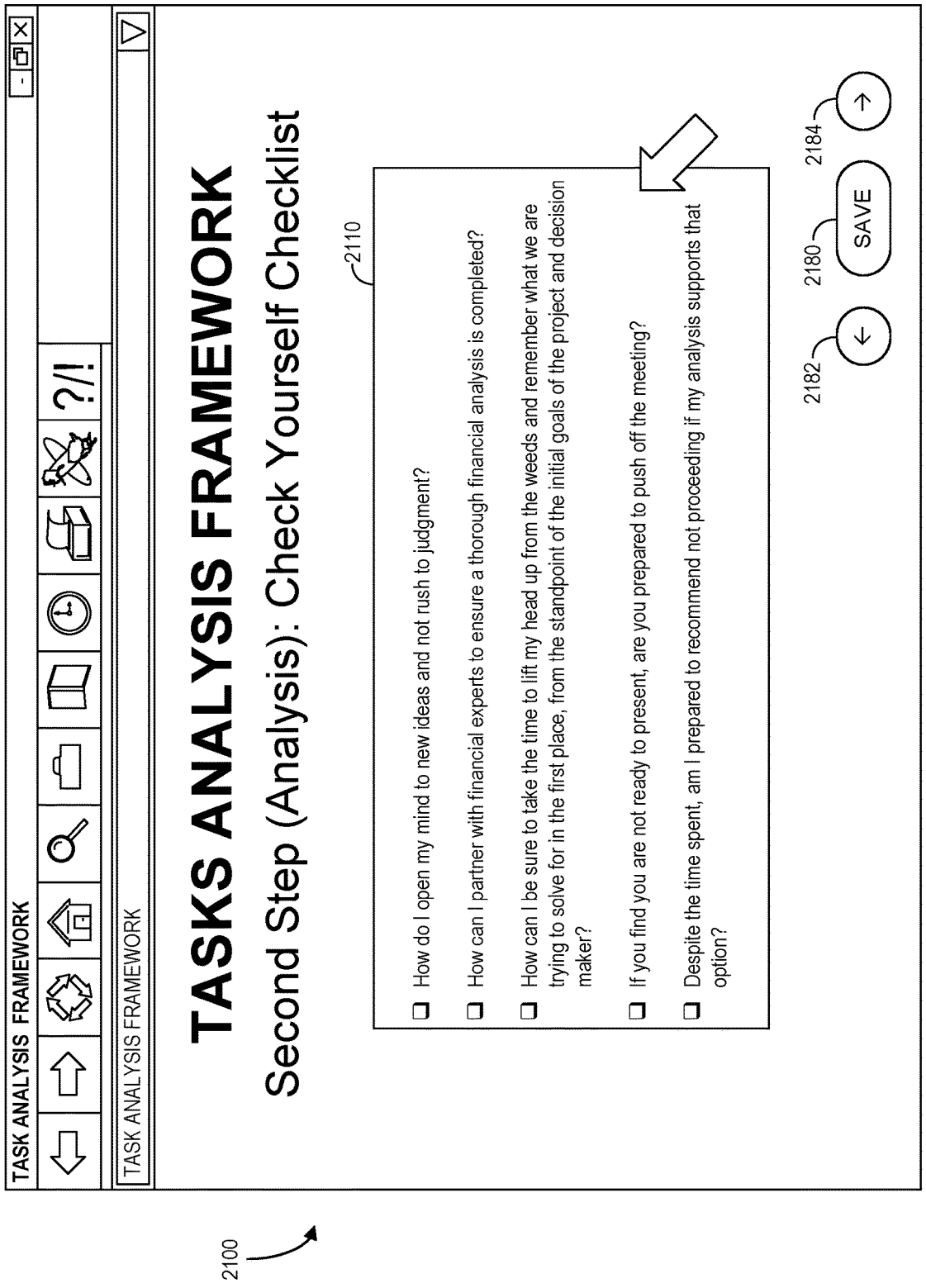
FIG. 21 is an example of a second step (analysis) "check yourself" checklist display in accordance with some embodiments.

FIG. 21 is an example of a second step (analysis) "check yourself" checklist display 2100 in accordance with some embodiments. The display 2100 includes a checklist 2110 that may be used to enter information about: how to keep an open mind for new ideas and not rush to judgment; how to partner with financial experts to ensure a thorough financial analysis is completed; how to take the time to get out of the weeds and remember the problem to be solved in the first place (from the standpoint of the initial goals of the project and decision maker); if the user is not ready to present, is he or she prepared to push off the meeting; despite the time spent, is the user prepared to recommend not proceeding if the analysis supports that option; etc. The display 2100 includes icons to let the user save information 2180, return to a prior display 2182, and/or advance to the next display 2184.

Figure 22:
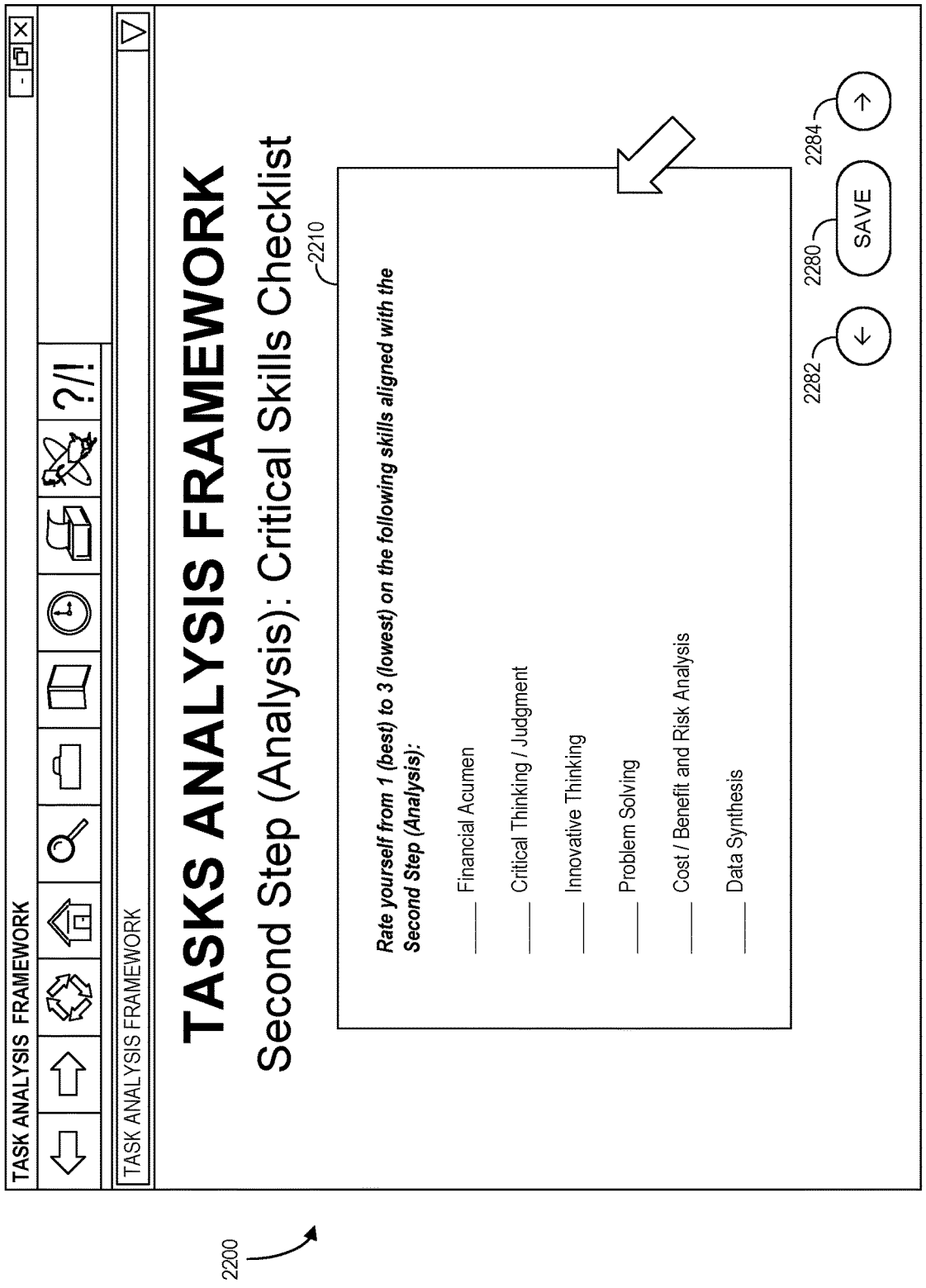
FIG. 22 is an example of a second step (analysis) self-rating display according to some embodiments.

FIG. 22 is an example of a second step (analysis) self-rating display 2200 according to some embodiments. The display 2200 may ask 2210 a user to rate himself or herself from 1 (best) to 3 (lowest) on the following skills aligned with the second step (analysis): financial acumen, critical thinking and/or judgment, innovative thinking, problem solving, cost and/or benefit and risk analysis, data synthesis, audience analysis, decision making, etc. The display 2200 includes icons to let the user save information 2280, return to a prior display 2282, and/or advance to the next display 2284.

Figure 23:
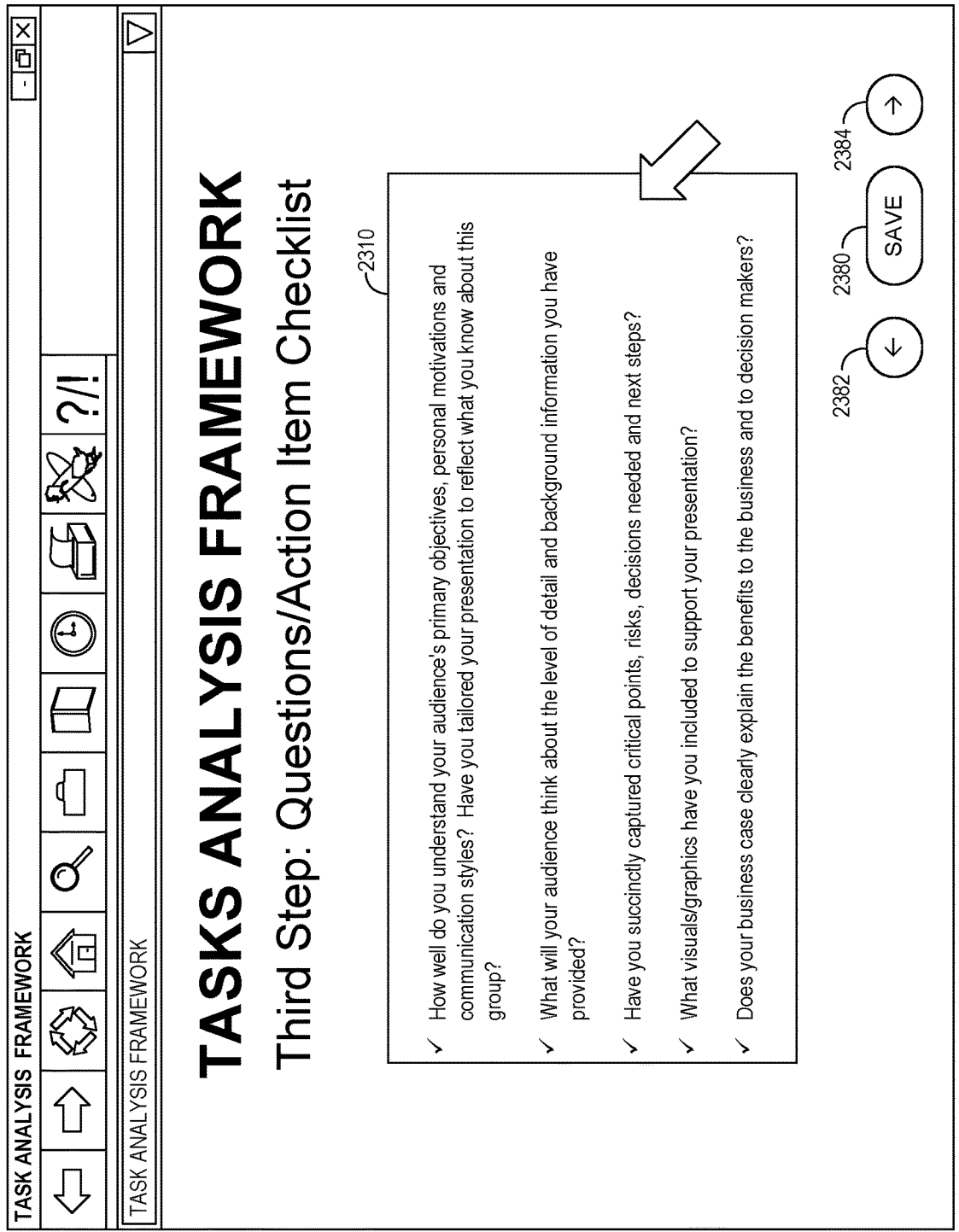
FIG. 23 is an example of a third step questions and action items checklist display according to some embodiments.

After the second step is complete, the third step may help a user create a compelling way to present a business case about a task to be performed. The goals of step three might include: select best way to present the case, based on topic and audience; build materials into crisp recommendation with clear conclusions; create compelling visuals and a story (using storyboard); appeal to decision maker's goals, needs and style; verify numbers; practice presentation; prepare for possible questions and/or resistance; communicate a compelling business case and/or story; be succinct; stress impact of decision on organization and on decision maker; invite stakeholders to react and/or challenge; probe for understanding; project confidence and a strong presence; respond to detailed questions in the moment; address resistance; gain approval and sponsorship; gain agreement on next steps and accountability; etc. To help achieve these goals, FIG. 23 is an example of a third step questions and action items checklist display 2300 according to some embodiments. The display 2300 includes a checklist 2310 that may be used to enter data about: understanding an audience's primary objectives, personal motivations and communication styles (is the presentation tailored to reflect what is known about this group); what will the audience think about the level of detail and background information provided; does the presentation succinctly capture critical points, risks, decisions needed, and next steps; what visuals/graphics have been included to support the presentation; does the business case clearly explain the benefits to the business and to decision makers; are responses to questions business partners are most likely to ask prepared (particularly, tough questions indicating resistance); what stories have been included to enhance audience interest and engagement; how to keep the presentation focused and concise (is the user prepared to facilitate the group process); is all the needed backup data included if someone requests further detail; does the presentation come across as confident with strong presence; is the presentation rehearsed to solicit constructive feedback from peers and other stakeholders; etc. The display 2300 includes icons to let the user save information 2380, return to a prior display 2382, and/or advance to the next display 2384.

Figure 24:
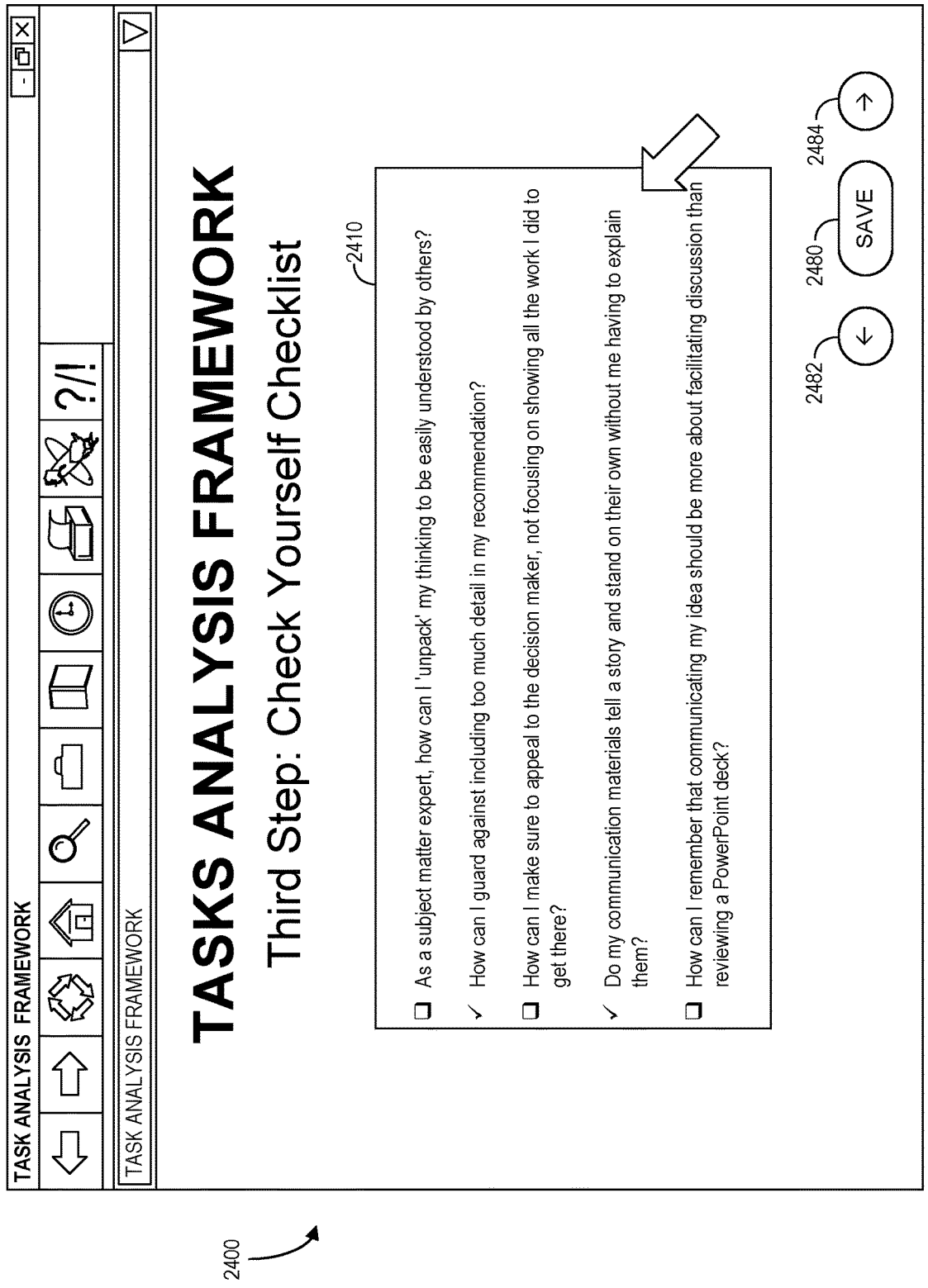
FIG. 24 is an example of a third step "check yourself" checklist display in accordance with some embodiments.

FIG. 24 is an example of a third step "check yourself" checklist display 2400 in accordance with some embodiments. The display 2400 includes a checklist 2410 that may be used to enter information about: how can a SME "unpack" thinking to be easily understood by others; how to guard against including too much detail in the recommendation; how to appeal to the decision maker (not focusing on the work done to get there); do the communication materials tell a story and stand on their own without needing to explain them; how to communicate ideas about facilitating discussion (instead of reviewing a PowerPoint deck); that if a meeting is short, that may be a good thing; does the user undervalue the importance of clear, effective communication; is the user prepared to navigate the second and third level of questioning that he or she might get from various members of the audience; etc. The display 2400 includes icons to let the user save information 2480, return to a prior display 2482, and/or advance to the next display 2484.

Figure 25:
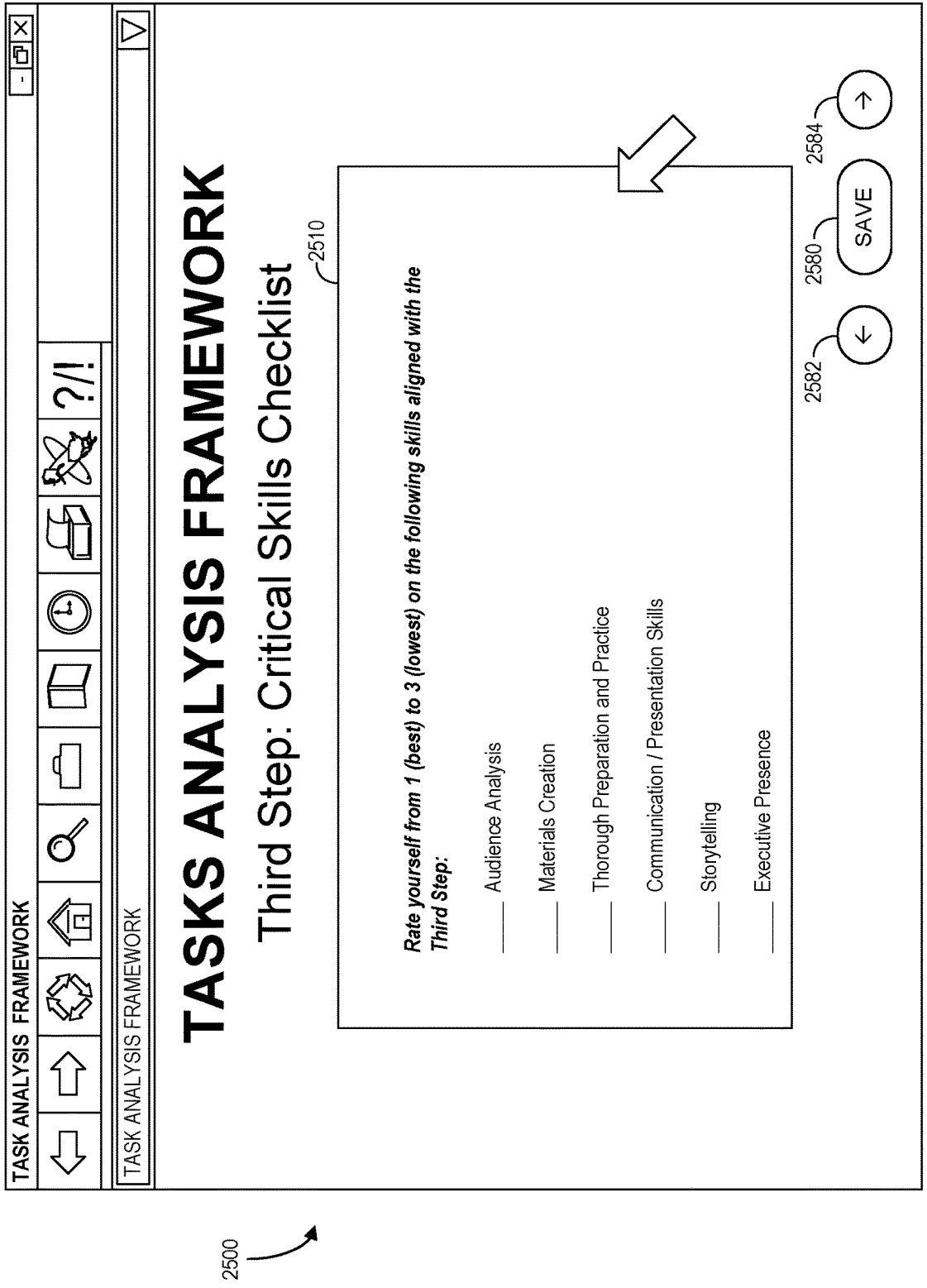
FIG. 25 is an example of a third step self-rating display according to some embodiments.

FIG. 25 is an example of a third step self-rating display 2500 according to some embodiments. The display 2500 may ask 2510 a user to rate himself or herself from 1 (best) to 3 (lowest) on the following skills aligned with the third step: audience analysis, materials creation, thorough preparation and practice, communication and/or presentation skills, storytelling, executive presence, emotional intelligence, etc. The display 2500 includes icons to let the user save information 2580, return to a prior display 2582, and/or advance to the next display 2584.

Figure 26:
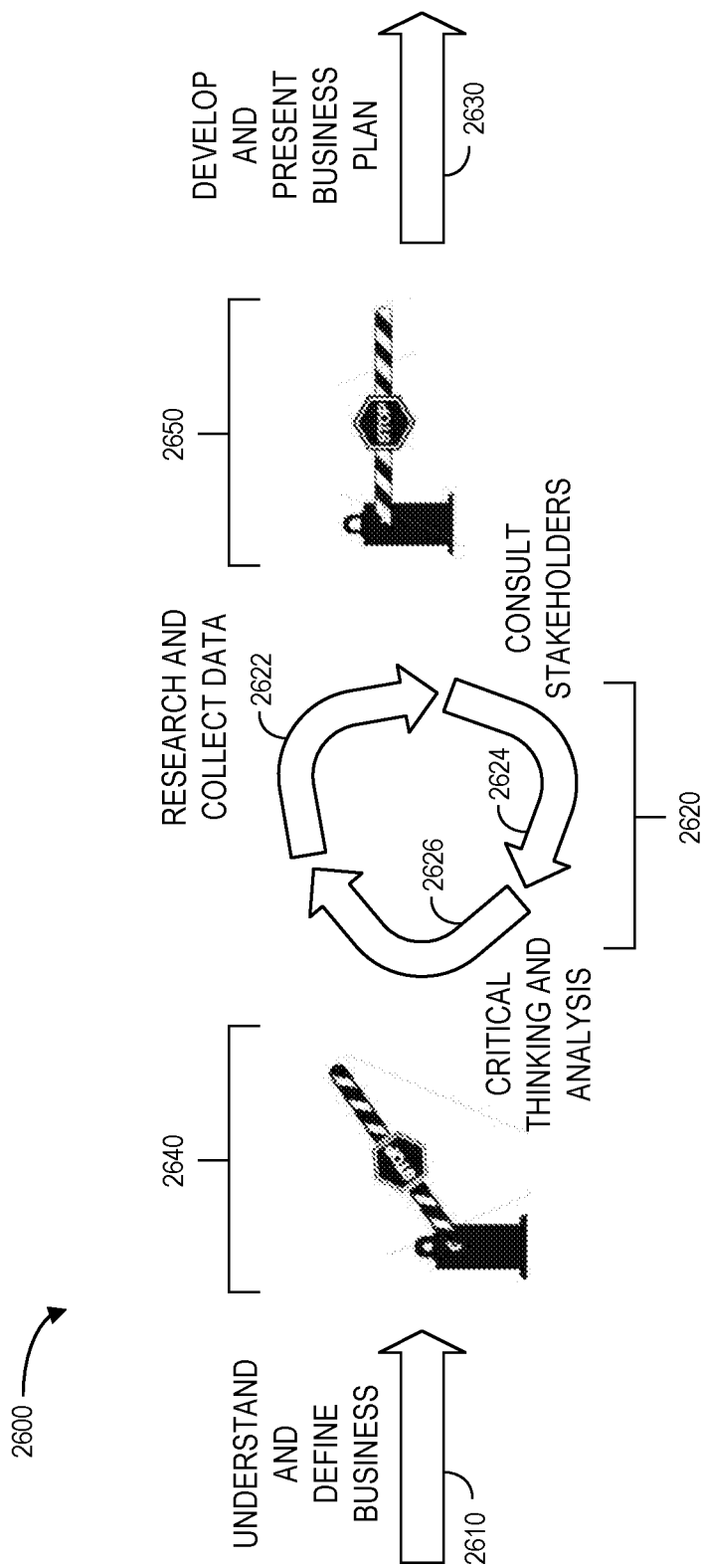
FIG. 26 illustrates a task analysis process flow with tollgates in accordance with some embodiments.

According to some embodiments, a user may freely move around and/or a task analysis framework. In other embodiments, the system may guide or limit a user's movement within the framework. For example, FIG. 26 illustrates a task analysis process flow 2600 with tollgates in accordance with some embodiments. As before, the framework 2600 may include a first step 2610 that is associated with understanding and defining a task. The first step 2610 may, for example, help ensure that a user has a thorough understanding of the task objective and desired outcomes (and may comprise a critical step in the overall process). In the first step 2610, a user might define a business opportunity or problem and a desired future state, identify and contract others about expectations for the project, clarify a decision maker's goals, needs, and style, identify business drivers and/or metrics associated with the task, identify financial targets, evaluate customer experience and expectations, develop an opportunity and/or problem statement, etc.

Before allowing the user to advance from the first step 2610 to a second step 2610, the system may implement an access control or "tollbooth" 2640 to ensure that the user has completed a sufficient portion of the first step 2610 before allowing access to materials associated with the second step 2620. For example, has the user completed all checklists, self-rating processes (with sufficient scores), etc. for the first step 2610? In some cases, the user may need to complete 100% of the elements, some other predetermined percentage of the elements, a particular number of elements for the first step 2610, etc. Other examples might include an artificial intelligence or machine learning review of the information provided by the user. Still other examples might include a review of whether or not the user has attached sufficient supporting documentation associated with the first step 2610. In some embodiments, a manual review of the first step 2610 elements (e.g., by a manager, supervisor, or team member) may be required before access to the second step 2620 is allowed.

The second step 2620 may be associated with analyzing the task, and various portions of the second step 2620 may be repeated to ensure that a selected recommendation has been fully vetted and researched, all necessary stakeholders have been engaged, and that the recommendation is based on concrete research and sound judgment. That is, the process of the second step 2620 may be repeated until analysis is complete and a best recommendation is selected. The second step 2620 may include, for example, a research portion 2622, a consult portion 2624, and an analysis portion 2626. In this example, another tollbooth 2650 is provided to ensure that the second step has been sufficiently completed before allowing access to a third step 2630 to develop and present a task plan. The third step 2630 may select a best way to present a case, based on topic and audience (e.g., "create a story line"), build materials into crisp recommendation with clear conclusions, create compelling visuals and a story (using storyboard), appeal to a decision maker's goals, etc.

Figure 27:
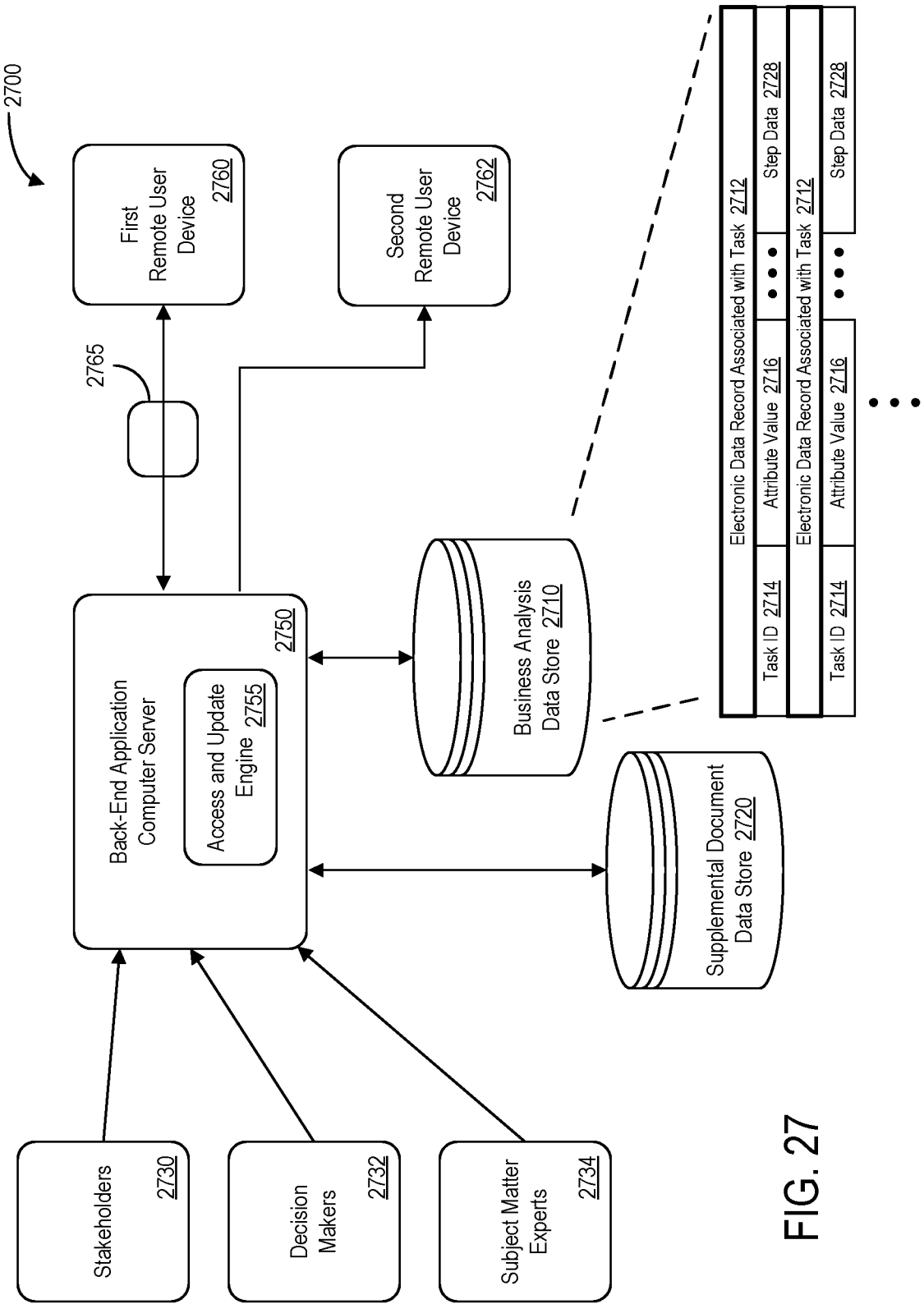
FIG. 27 is a more detailed block diagram of a system according to some embodiments.

FIG. 27 is a more detailed block diagram of a system 2700 according to some embodiments. The system 2700 includes a back-end application computer server 2750 that may access information in a business analysis data store 2710 (e.g., storing a set of electronic records 2712 representing tasks, each record including, for example, task identifiers 2714, attribute variables 2716, step data 2728, etc.) and a supplemental document data store 2720. The back-end application computer server 2750 may also retrieve information from other data stores or sources in connection with an access and update engine 2755 to populate, access, verify, analyze, and/or update the electronic records. The back-end application computer server 2750 may also exchange information with remote user devices 2760, 2762 (e.g., via a firewall 2765). According to some embodiments, an interactive graphical user interface platform of the back-end application computer server may facilitate forecasts, decisions, predictions, and/or the display of results via one or more remote administrator computers (e.g., to gather additional information about task analysis) and/or the remote user devices 2760, 2762.

According to some embodiments, the back-end application computer server 2750 may also receive external information, such as stakeholders 2730, decision makers 2732, and subject matter experts 2734. This data might be used, for example, to pre-populate fields in the business analysis and/or supplemental document data stores 2710, 2720. A user may then review the information via remote user devices 2760, 2762 and transmit updated information to the back-end application computer server 2750. Based on the updated information, the back-end application computer server 2750 may adjust data in the business analysis and/or supplemental document data stores 2710, 2720 and make that information available to other employees of an enterprise as appropriate. According to some embodiments, the back-end application computer server 2750 may transmit information to an email server, workflow application, a chatbot text interface, a streaming video interface, a voice recognition application, or a calendar function (e.g., to generate reminders that checklist has not yet been completed). This information might be used by the system 2700, for example, to automatically establish a channel of communication with an employee, automatically transmit a message to a manager, etc. Similarly, the back-end application computer server 2750 might transmit updated electronic records 2712 to a manager for manual review and a decision about whether a request to proceed with an analysis should be approved.

Figure 28:
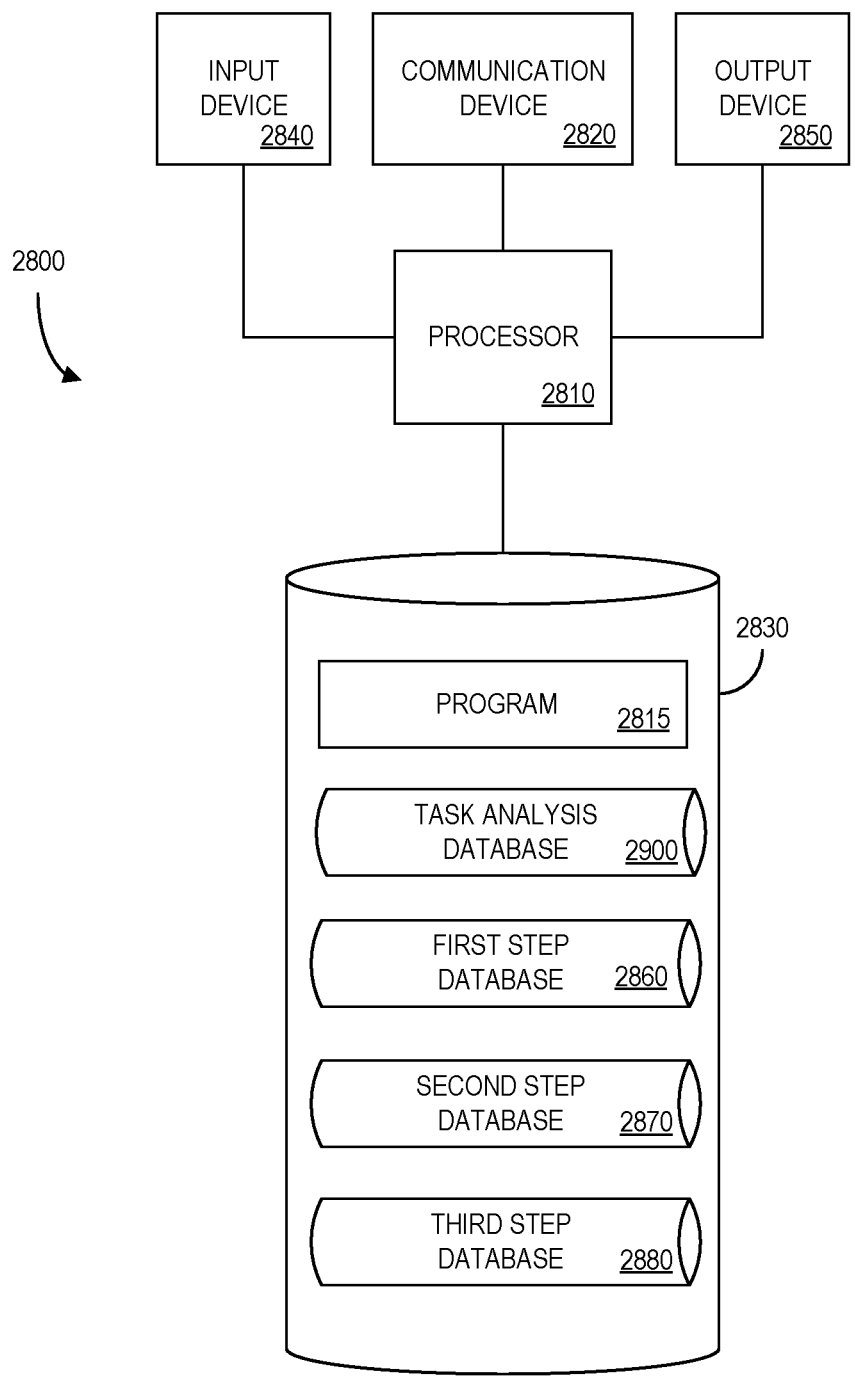
FIG. 28 is a block diagram of an apparatus in accordance with some embodiments of the present invention.

The embodiments described herein may be implemented using any number of different hardware configurations. For example, FIG. 28 illustrates an apparatus 2800 that may be, for example, associated with the systems 100, 2700 described with respect to FIGS. 1 and 27, respectively. The apparatus 2800 comprises a processor 2810, such as one or more commercially available Central Processing Units ("CPUs") in the form of one-chip microprocessors, coupled to a communication device 2820 configured to communicate via a communication network (not shown in FIG. 28). The communication device 2820 may be used to communicate, for example, with one or more remote administrator computers and or communication devices (e.g., PCs and smartphones). Note that communications exchanged via the communication device 2820 may utilize security features, such as those between a public internet user and an internal network of the insurance enterprise. The security features might be associated with, for example, web servers, firewalls, and/or PCI infrastructure. The apparatus 2800 further includes an input device 2840 (e.g., a mouse and/or keyboard to enter information about tasks, checklists, etc.) and an output device 2850 (e.g., to output reports regarding task analysis status, presentations, etc.).

The processor 2810 also communicates with a storage device 2830. The storage device 2830 may comprise any appropriate information storage device, including combinations of magnetic storage devices (e.g., a hard disk drive), optical storage devices, mobile telephones, and/or semiconductor memory devices. The storage device 2830 stores a program 2815 and/or a risk evaluation tool or application for controlling the processor 2810. The processor 2810 performs instructions of the program 2815, and thereby operates in accordance with any of the embodiments described herein. For example, the processor 2810 may receive, from a remote user device, first step data about task objectives for task identifier and update a task analysis database 2900. The processor 2810 may then automatically evaluate the first step data in accordance with a first step data evaluation rule. When the first step data complies with the first step data evaluation rule, the processor 2810 may permit receipt of second step data about a task analysis and update the task analysis database 2900. The processor 2810 may then automatically evaluate the second step data in accordance with a second step data evaluation rule. When the second step data complies with the second step data evaluation rule, the processor 2810 may permit receipt of third step data about analysis presentation and update the task analysis database 2900.

The program 2815 may be stored in a compressed, uncompiled and/or encrypted format. The program 2815 may furthermore include other program elements, such as an operating system, a database management system, and/or device drivers used by the processor 2810 to interface with peripheral devices.

As used herein, information may be "received" by or "transmitted" to, for example: (i) the back-end application computer server 2800 from another device; or (ii) a software application or module within the back-end application computer server 2800 from another software application, module, or any other source.

In some embodiments (such as shown in FIG. 28), the storage device 2830 further stores the task analysis database 2900, a first step database 2860, a second step database 2870, and a third step database 2880. An example of a database that might be used in connection with the apparatus 2800 will now be described in detail with respect to FIG. 29. Note that the database described herein is only an example, and additional and/or different information may be stored therein. Moreover, various databases might be split or combined in accordance with any of the embodiments described herein. For example, the task analysis database 2900 and third step database 2880 might be combined and/or linked to each other within the program 2815.

Figure 29:
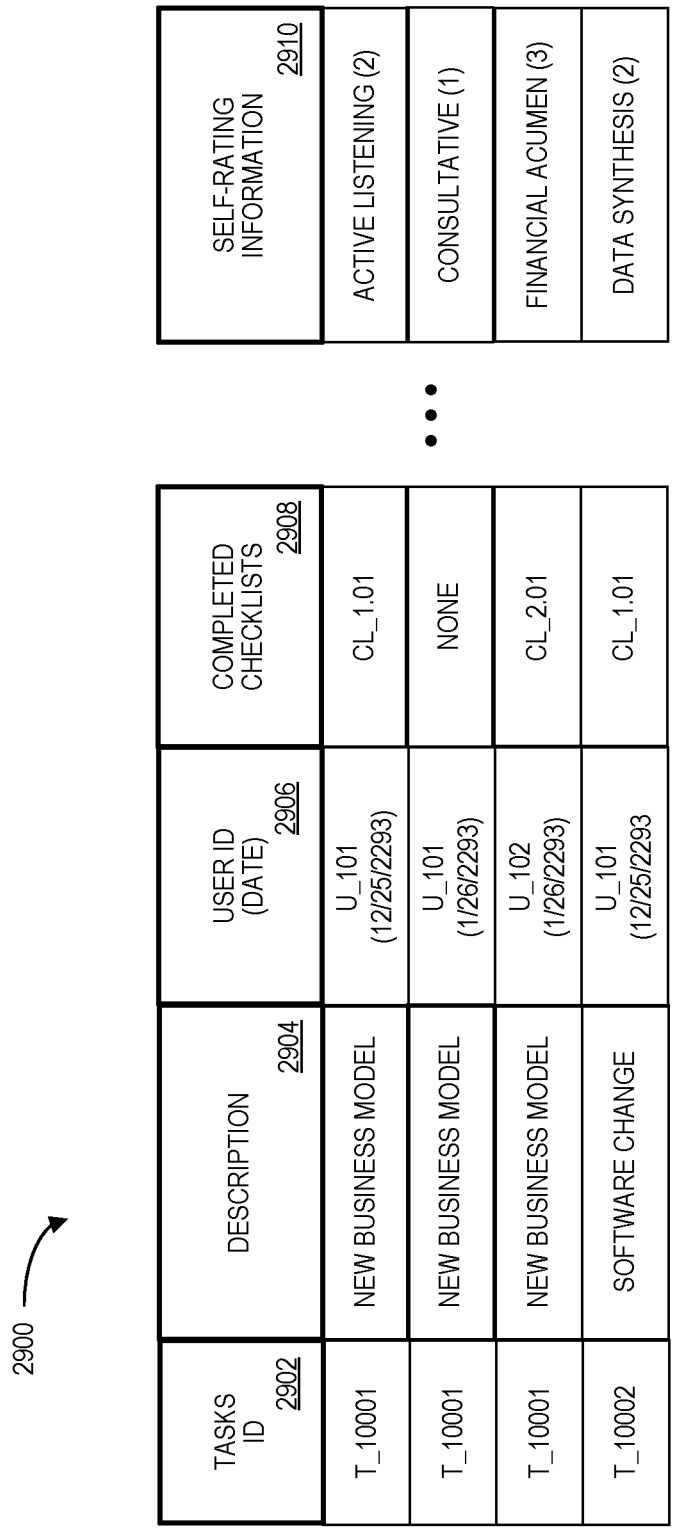
FIG. 29 is a portion of a tabular task analysis database according to some embodiments.

Referring to FIG. 29, a table is shown that represents the task analysis database 2900 that may be stored at the apparatus 2800 according to some embodiments. The table may include, for example, entries associated with tasks that are to be analyzed by a user or team of an enterprise. The table may also define fields 2902, 2904, 2906, 2908, 2910 for each of the entries. The fields 2902, 2904, 2906, 2908, 2910 may, according to some embodiments, specify: a task identifier 2902, a description 2904, a user identifier (and associated date) 2906, completed checklists 2908, and self-rating information 2910. The task analysis database 2900 may be created and updated, for example, based on information electrically received from various computer systems, including those associated with remote user terminals.

The task identifier 2902 may be, for example, a unique alphanumeric code identifying a task to be analyzed for an enterprise (e.g., a new software program to be installed, a proposed purchase or merger of a business, etc.). The description 2904 may describe the task, and the user identifier (and associated date) 2906 may indicate an employee of the enterprise who is working on the analysis (and when he or she last updated materials). The completed checklists 2908 may indicate, for example, questions and action items checklists that have been completed by the user. Similarly, the self-rating information 2910 may indicate scores or grades that a user has provided regarding his or her analysis.

Thus, embodiments may provide an automated and efficient way to enter, access, and update electronic records representing a task analysis framework for an enterprise in a way that provides faster, more accurate results. Embodiments may also provide an ability to better understand a task and to communicate information about the analysis to others (e.g., stakeholders and decision makers).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 30:
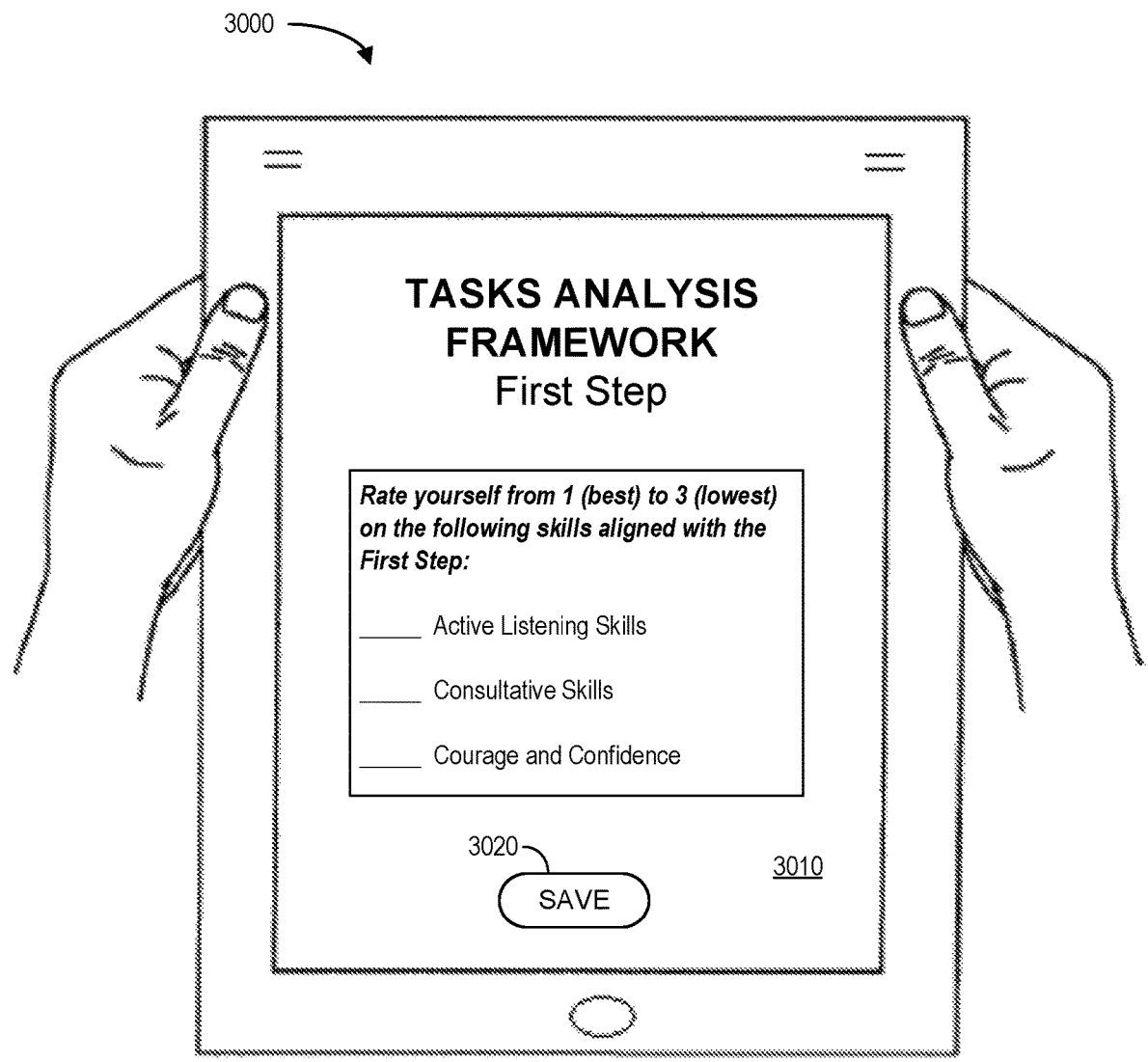
FIG. 30 illustrates a tablet computer displaying a task analysis display according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of enterprises (e.g., an insurance company), embodiments may instead be associated with other types of businesses in additional to and/or instead of those described herein (e.g., financial institutions, universities, governmental departments, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 30 illustrates a handheld tablet computer 3000 showing a task analysis display 3010 according to some embodiments. The task analysis display 3010 might include a self-rating display that can be selected and/or modified by a user of the handheld computer 3000 and submitted to be stored for later access or review (e.g., via a "Save" icon 3020).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to access and update electronic record information via a back-end application computer server of an enterprise, comprising:
   (a) a task analysis data store, accessible via an encrypted database management system, the task analysis data store containing electronic records that represent a plurality of task analysis items for the enterprise and, for each planned task analysis item, an electronic record identifier and a set of task analysis item attribute values including a task identifier;
   (b) the back-end application computer server, coupled to the task analysis data store, including:
   a computer processor, and
   a computer memory, coupled to the computer processor and storing instructions that, when executed by the computer processor, cause the back-end application computer server to:
      (i) receive, from a remote user device associated with a user via at least one security feature component, first step data about task objectives associated with the task identifier,
      (ii) update the task analysis data store based on the received first step data, (iii) automatically evaluate the first step data in accordance with at least one first step data evaluation rule, (iv) automatically generate an alert signal when the first step data diverges from the at least one first step data evaluation rule by more than a threshold amount, (v) when the first step data complies with the at least one first step data evaluation rule, permit receipt of second step data about a task analysis associated with the task identifier, wherein the second step data includes an audience analysis for an assigned decision maker, and (vi) prevent, via an access control toll booth, receipt of second step data when the first step data is not in compliance with the at least one first step data evaluation rule thereby reducing the number of messages that need to be transmitted, (vii) update the task analysis data store based on the received second step data, (viii) automatically evaluate the second step data in accordance with at least one second step data evaluation rule, (vix) when the second step data complies with the at least one second step data evaluation rule, permit receipt of third step data about analysis presentation associated with the task identifier, and (x) prevent, via an access control toll booth, receipt of third step data when the second step data is not in compliance with the at least one second step data evaluation rule thereby reducing the number of messages that need to be transmitted and (xi) update the task analysis data store based on the received third step data;

(xii) automatically generate physical presentation materials based on information in the task analysis data store;

(c) a communication port coupled to the back-end application computer server to facilitate a transmission of data with multiple remote user devices to support interactive user interface displays via a distributed communication network; and (d) an email server receiving information from the back-end application computer server which automatically establishes a channel of communication, via exchanged records, with an employee through the alert signal and a reminder that the employee has not completed entering at least one of the first step data and the second step data.

2. The system of claim 1, wherein the task analysis item attribute values include at least one of: (i) a desired future state, (ii) a task driver, (iii) a checklist, (iv) a performance metric, (v) criteria of success, (vi) self-rating data, (vii) risk information, (viii) a mitigation plan, (ix) an audience analysis, and (x) potential questions and responses.

3. The system of claim 1, wherein at least one evaluation rule is associated with: (i) a checklist completion, (ii) a self-rating, (iii) supporting documentation, (iv) a minimum amount of time, (v) a percentage of completion, (vi) an artificial intelligence review, and (vii) manual review by at least one other user.

4. The system of claim 1, wherein the first step data is associated with at least one of:

(i) benefit details for the enterprise, (ii) risk details for the enterprise, (iii) a subject matter expert identifier.

5. The system of claim 1, wherein the second step data is associated with at least one of: (i) research and data collection, (ii) stakeholder consultation, and (iii) critical analysis.

6. The system of claim 5, wherein the second step is associated with a repeated process, until a recommendation is selected, including all the following: (i) research and data collection, (ii) stakeholder consultation, and (iii) critical analysis.

7. The system of claim 5, wherein the second step data includes a stakeholder analysis containing at least one of: (i) a stakeholder identifier, (ii) a stakeholder role, (iii) an anticipated reaction, (iv) stakeholder needs and concerns, (v) enterprise needs, and (vi) plan data.

8. The system of claim 5, wherein the second step data further includes decision making model information.

9. The system of claim 1, wherein the back-end application computer server is further programmed to transmit information from the task analysis data store to another remote device associated with another user.

10. A computerized method to access and update electronic record information via a back-end application computer server of an enterprise, comprising:

receiving, at the back-end application computer server from a remote user device associated with a user via at least one security feature component, first step data about task objectives associated with a task identifier;

updating a task analysis data store based on the received first step data, wherein the task analysis data store is accessible via an encrypted database management system and contains electronic records representing a plurality of task analysis items for the enterprise and, for each planned task analysis item, an electronic record identifier and a set of task analysis item attribute values including the task identifier;

automatically evaluating the first step data in accordance with at least one first step data evaluation rule;

automatically generating an alert signal when the first step data diverges from the at least one first step data evaluation rule by more than a threshold amount;

when the first step data complies with the at least one first step data evaluation rule, permitting receipt of second step data about a task analysis associated with the task identifier, wherein the second step data includes an audience analysis for an assigned decision maker;

when the first step data is not in compliance with the at least one first step data evaluation rule, preventing, via an access control toll booth, receipt of the second step data thereby reducing the number of messages that need to be transmitted;

updating the task analysis data store based on the received second step data;

automatically evaluating the second step data in accordance with at least one second step data evaluation rule;

when the second step data complies with the at least one second step data evaluation rule, permitting receipt of third step data about analysis presentation associated with the task identifier;

when the second step data is not in compliance with the at least one second step data evaluation rule, preventing, via an access control toll booth, receipt of the third step data thereby reducing the number of messages that need to be transmitted;

updating the task analysis data store based on the received third step data;

automatically generating physical presentation materials based on information in the task analysis data store; and receiving, at an email server, information from the back-end application computer server which automatically establishes a channel of communication, via exchanged records, with an employee through the alert signal and a reminder that the employee has not completed entering at least one of the first step data and the second step data.

11. The method of claim 10, wherein the task analysis item attribute values include at least one of: (i) a desired future state, (ii) a task driver, (iii) a checklist, (iv) a performance metric, (v) criteria of success, (vi) self-rating data, (vii) risk information, (viii) a mitigation plan, (ix) an audience analysis, and (x) potential questions and responses.

12. The method of claim 10, wherein at least one evaluation rule is associated with: (i) a checklist completion, (ii) a self-rating, (iii) supporting documentation, (iv) a minimum amount of time, (v) a percentage of completion, (vi) an artificial intelligence review, and (vii) manual review by at least one other user.

13. The method of claim 10, wherein the first step data is associated with at least one of: (i) benefit details for the enterprise, (ii) risk details for the enterprise, (iii) a subject matter expert identifier.

14. The method of claim 10, wherein the second step data is associated with at least one of: (i) research and data collection, (ii) stakeholder consultation, and (iii) critical analysis.

15. The method of claim 14, wherein the second step is associated with a repeated process, until a recommendation is selected, including all the following: (i) research and data collection, (ii) stakeholder consultation, and (iii) critical analysis.

16. The method of claim 14, wherein the second step data includes a stakeholder analysis containing at least one of: (i) a stakeholder identifier, (ii) a stakeholder role, (iii) an anticipated reaction, (iv) stakeholder needs and concerns, (v) enterprise needs, and (vi) plan data.

17. The method of claim 14, wherein the second step data further includes decision making model information.

18. A non-tangible, computer-readable medium storing instructions, that, when executed by a processor, cause the processor to perform a method to access and update electronic record information via a back-end application computer server of an enterprise, the method comprising:

receiving, at the back-end application computer server from a remote user device associated with a user via at least one security feature, first step data about task objectives associated with a task identifier;

updating a task analysis data store based on the received first step data, wherein the task analysis data store is accessible via an encrypted database management system, and the task analysis data store contains electronic records representing a plurality of task analysis items for the enterprise and, for each planned task analysis item, an electronic record identifier and a set of task analysis item attribute values including the task identifier;

automatically evaluating the first step data in accordance with at least one first step data evaluation rule;

automatically generating an alert signal when the first step data diverges from the at least one first step data evaluation rule by more than a threshold amount;

when the first step data complies with the at least one first step data evaluation rule, permitting receipt of second step data about a task analysis associated with the task identifier, wherein the second step data includes an audience analysis for an assigned decision maker;

when the first step data is not in compliance with the at least one first step data evaluation rule, preventing, via an access control toll booth, receipt of second step data when the first step data is not in compliance with the at least one first step data evaluation rule thereby reducing the number of messages that need to be transmitted;

updating the task analysis data store based on the received second step data;

automatically evaluating the second step data in accordance with at least one second step data evaluation rule;

when the second step data complies with the at least one second step data evaluation rule, permitting receipt of third step data about analysis presentation associated with the task identifier;

when the second step data is not in compliance with the at least one second step data evaluation rule, preventing, via an access control toll both, receipt of third step data thereby reducing the number of messages that need to be transmitted;

updating the task analysis data store based on the received third step data;

automatically generate physical presentation materials based on information in the task analysis data store; and receiving, at an email server, information from the back-end application computer server which automatically establishes a channel of communication, via exchanged records, with an employee through the alert signal and a reminder that the employee has not completed entering at least one of the first step data and the second step data.

19. The medium of claim 18, wherein the method further comprises:

transmitting information from the task analysis data store to another remote device associated with another user.

\* \* \* \* \*